United States Patent
Lu et al.

(10) Patent No.: US 11,592,790 B2
(45) Date of Patent: Feb. 28, 2023

(54) MIMO DIFFERENT-FACTOR PARTIAL-FORM MODEL-FREE CONTROL WITH PARAMETER SELF-TUNING

(71) Applicant: ZHEJIANG UNIVERSITY, Zhejiang (CN)

(72) Inventors: Jiangang Lu, Zhejiang (CN); Chen Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 511 days.

(21) Appl. No.: 16/777,122

(22) Filed: Jan. 30, 2020

(65) Prior Publication Data

US 2020/0249643 A1 Aug. 6, 2020

(30) Foreign Application Priority Data

Feb. 1, 2019 (CN) .......................... 201910103033.1

(51) Int. Cl.
| | |
|---|---|
| G05B 13/04 | (2006.01) |
| G05B 13/02 | (2006.01) |
| G06N 3/084 | (2023.01) |
| G06N 3/04 | (2023.01) |

(52) U.S. Cl.
CPC ......... *G05B 13/042* (2013.01); *G05B 13/027* (2013.01); *G06N 3/0445* (2013.01); *G06N 3/0454* (2013.01); *G06N 3/084* (2013.01)

(58) Field of Classification Search
CPC .. G05B 13/024; G05B 13/041; G05B 13/048; G05B 13/027; G05B 2219/39062; G05B 2219/41366; G05B 2219/42017; G05B 13/042; G06K 9/6223; G06K 9/6262; G06K 9/00536; G06N 3/049; G06N 3/084; G06N 3/0445; G06N 3/0454; H04B 7/0413; G06F 17/16

See application file for complete search history.

(56) References Cited

U.S. PATENT DOCUMENTS

| | | | | |
|---|---|---|---|---|
| 2020/0249641 | A1* | 8/2020 | Lu | .......................... G06K 9/6223 |
| 2020/0249642 | A1* | 8/2020 | Lu | .......................... G06K 9/6223 |
| 2020/0249643 | A1* | 8/2020 | Lu | .......................... G06N 3/0445 |

* cited by examiner

*Primary Examiner* — Abderrahim Merouan

(74) *Attorney, Agent, or Firm* — Muncy, Geissler, Olds & Lowe, P.C.

(57) ABSTRACT

The invention discloses a MIMO different-factor partial-form model-free control method with parameter self-tuning. In view of the limitations of the existing MIMO partial-form model-free control method with the same-factor structure, namely, at time k, different control inputs in the control input vector can only use the same values of penalty factor and step-size factors, the invention proposes a MIMO partial-form model-free control method with the different-factor structure, namely, at time k, different control inputs in the control input vector can use different values of penalty factors and/or step-size factors, which can solve control problems of strongly nonlinear MIMO systems with different characteristics between control channels widely existing in complex plants. Meanwhile, parameter self-tuning is proposed to effectively address the problem of time-consuming and cost-consuming when tuning the penalty factors and/or step-size factors. Compared with the existing method, the inventive method has higher control accuracy, stronger stability and wider applicability.

7 Claims, 11 Drawing Sheets

MIMO DIFFERENT-FACTOR PARTIAL-FORM MODEL-FREE CONTROL WITH PARAMETER SELF-TUNING

FIELD OF THE INVENTION

The present invention relates to the field of automatic control, and more particularly to MIMO different-factor partial-form model-free control with parameter self-tuning.

BACKGROUND OF THE INVENTION

In the fields of oil refining, petrochemical, chemical, pharmaceutical, food, paper, water treatment, thermal power, metallurgy, cement, rubber, machinery, and electrical industry, most of the controlled plants, such as reactors, distillation columns, machines, devices, equipment, production lines, workshops and factories, are essentially MIMO systems (multi-input multi-output systems). Realizing the control of MIMO systems with high accuracy, strong stability and wide applicability is of great significance to energy saving, consumption reduction, quality improvement and efficiency enhancement in industries. However, the control problems of MIMO systems, especially of those with strong nonlinearities, have always been a major challenge in the field of automatic control.

MIMO partial-form model-free control method is one of the existing control methods for MIMO systems. MIMO partial-form model-free control method is a data-driven control method, which is used to analyze and design the controller depending only on the online measured input data and output data instead of any mathematical model information of the MIMO controlled plant, and has good application prospects with concise implementation, low computational burden and strong robustness. The theoretical basis of MIMO partial-form model-free control method is proposed by Hou and Jin in *Model Free Adaptive Control: Theory and Applications* (Science Press, Beijing, China, 2013, p. 105), the control scheme is given as follows:

$$u(k) = u(k-1) + \frac{\Phi_1^T(k)\left(\rho_1 e(k) - \sum_{p=2}^{L}\rho_p \Phi_p(k)\Delta u(k-p+1)\right)}{\lambda + \|\Phi_1(k)\|^2}$$

where $u(k)$ is the control input vector at time k, $u(k) = [u_1(k), \ldots, u_m(k)]^T$, m is the total number of control inputs (m is a positive integer greater than 1), $\Delta u(k) = u(k) - u(k-1)$; $e(k)$ is the error vector at time k, $e(k) = [e_1(k), \ldots, e_n(k)]^T$, n is the total number of system outputs (n is a positive integer); $\Phi(k)$ is the estimated value of pseudo partitioned Jacobian matrix for MIMO system at time k, $\Phi_p(k)$ is the p-th block of $\Phi(k)$ (p is a positive integer, $1 \leq p \leq L$), $\|\Phi_1(k)\|$ is the 2-norm of matrix $\Phi_1(k)$; $\lambda$ is the penalty factor; $\rho_1, \ldots, \rho_L$ are the step-size factors; L is the control input length constant of linearization and L is a positive integer.

The above-mentioned existing MIMO partial-form model-free control method adopts the same-factor structure, namely, at time k, different control inputs $u_1(k), \ldots, u_m(k)$ in the control input vector $u(k)$ can only use the same value of penalty factor $\lambda$, the same value of step-size factor $\rho_1, \ldots,$ and the same value of step-size factor $\rho_L$. However, when applied to complex plants, such as strongly nonlinear MIMO systems with different characteristics between control channels, the existing MIMO partial-form model-free control method with the same-factor structure is difficult to achieve ideal control performance, which restricts the popularization and application of MIMO partial-form model-free control method.

Therefore, in order to break the bottleneck of the existing MIMO partial-form model-free control method with the same-factor structure, the present invention proposes a method of MIMO different-factor partial-form model-free control with parameter self-tuning.

SUMMARY OF THE INVENTION

The present invention addresses the problems cited above, and provides a method of MIMO different-factor partial-form model-free control with parameter self-tuning, the method comprising:

when a controlled plant is a MIMO system, namely a multi-input multi-output system, a mathematical formula for calculating the i-th control input $u_i(k)$ at time k using said method is as follows:

$$u_i(k) = u_i(k-1) + \frac{\sum_{j=1}^{n}\phi_{j,i,1}(k)\left(\rho_{i,1}e_j(k) - \sum_{p=2}^{L}\rho_{i,p}\left(\sum_{iu=1}^{m}\phi_{j,iu,p}(k)\Delta u_{iu}(k-p+1)\right)\right)}{\lambda_i + \|\Phi_1(k)\|^2}$$

where k is a positive integer; m is the total number of control inputs in said MIMO system, m is a positive integer greater than 1; n is the total number of system outputs in said MIMO system, n is a positive integer; i denotes the i-th of the total number of control inputs in said MIMO system, i is a positive integer, $1 \leq i \leq m$; j denotes the j-th of the total number of system outputs in said MIMO system, j is a positive integer, $1 \leq j \leq n$; $u_i(k)$ is the i-th control input at time k; $\Delta u_{iu}(k) = u_{iu}(k) - u_{iu}(k-1)$, iu is a positive integer; $e_j(k)$ is the j-th error at time k, namely the j-th element in the error vector $e(k) = [e_1(k), \ldots, e_n(k)]^T$; $\Phi(k)$ is the estimated value of pseudo partitioned Jacobian matrix for said MIMO system at time k, $\Phi_p(k)$ is the p-th block of $\Phi(k)$, $\phi_{j,i,p}(k)$ is the j-th row and the i-th column of matrix $\Phi_p(k)$, $\|\Phi_1(k)\|$ is the 2-norm of matrix $\Phi_1(k)$; p is a positive integer, $1 \leq p \leq L$; $\lambda_i$ is the penalty factor for the i-th control input; $\rho_{i,p}$ is the p-th step-size factor for the i-th control input; L is the control input length constant of linearization and L is a positive integer;

for said MIMO system, traversing all values of i in the positive integer interval [1, m], and calculating the control input vector $u(k) = [u_1(k), \ldots, u_m(k)]^T$ at time k using said method;

said method has a different-factor characteristic; said different-factor characteristic is that at least one of the following L+1 inequalities holds true for any two unequal positive integers i and x in the positive integer interval [1, m] during controlling said MIMO system by using said method:

$\lambda_i \neq \lambda_x$; $\rho_{i,1} \neq \rho_{x,1}$; $\ldots$; $\rho_{i,L} \neq \rho_{x,L}$ during controlling said MIMO system by using said method, performing parameter during controlling said MIMO system by using said method, performing parameter self-tuning on the parameters to be tuned in said mathematical formula for calculating the control input vector $u(k) = [u_1(k), \ldots, u_m(k)]^T$ at time k; said parameters to be tuned comprise at least one of: penalty factors $\lambda_i$, and step-size factors $\rho_{i,1}, \ldots, \rho_{i,L}$ (i=1, ..., m).

Said parameter self-tuning adopts neural network to calculate the parameters to be tuned in the mathematical formula of said control input vector $u(k)=[u_1(k), \ldots, u_m(k)]^T$; when updating the hidden layer weight coefficients and output layer weight coefficients of said neural network, the gradients at time k of said control input vector $u(k)=[u_1(k), \ldots, u_m(k)]^T$ with respect to the parameters to be tuned in their respective mathematical formula are used; the gradients at time k of $u_i(k)$ (i=1, ..., m) in said control input vector $u(k)=[u_1(k), \ldots, u_m(k)]^T$ with respect to the parameters to be tuned in the mathematical formula of said $u_i(k)$ comprise the partial derivatives at time k of $u_i(k)$ with respect to the parameters to be tuned in the mathematical formula of said $u_i(k)$; the partial derivatives at time k of said $u_i(k)$ with respect to the parameters to be tuned in the mathematical formula of said $u_i(k)$ are calculated as follows:

when the parameters to be tuned in the mathematical formula of said $u_i(k)$ include penalty factor $\lambda_i$, the partial derivative at time k of $u_i(k)$ with respect to said penalty factor $\lambda_i$ is:

$$\frac{\partial u_i(k)}{\partial \lambda_i} = \frac{\sum_{j=1}^{n}\phi_{j,i,1}(k)\left(\sum_{p=2}^{L}\rho_{i,p}\left(\sum_{iu=1}^{m}\phi_{j,iu,p}(k)\Delta u_{iu}(k-p+1)\right)-\rho_{i,1}e_j(k)\right)}{\left(\lambda_i+\|\Phi_1(k)\|^2\right)^2}$$

when the parameters to be tuned in the mathematical formula of said $u_i(k)$ include step-size factor $\rho_{i,1}$, the partial derivative at time k of $u_i(k)$ with respect to said step-size factor $\rho_{i,1}$ is:

$$\frac{\partial u_i(k)}{\partial \rho_{i,1}} = \frac{\sum_{j=1}^{n}\phi_{j,i,1}(k)e_j(k)}{\lambda_i+\|\Phi_1(k)\|^2}$$

when the parameters to be tuned in the mathematical formula of said $u_i(k)$ include step-size factor $\rho_{i,p}$ where $2 \leq p \leq L$, the partial derivative at time k of $u_i(k)$ with respect to said step-size constant $\rho_{i,p}$ is:

$$\frac{\partial u_i(k)}{\partial \rho_{i,p}} = -\frac{\sum_{j=1}^{n}\phi_{j,i,1}(k)\left(\sum_{iu=1}^{m}\phi_{j,iu,p}(k)\Delta u_{iu}(k-p+1)\right)}{\lambda_i+\|\Phi_1(k)\|^2}$$

putting all partial derivatives at time k calculated by said $u_i(k)$ with respect to the parameters to be tuned in the mathematical formula of said $u_i(k)$ into the set {gradient of $u_i(k)$}; for said MIMO system, traversing all values of i in the positive integer interval [1, m] and obtaining the set {gradient of $u_1(k)$}, ..., set {gradient of $u_m(k)$}, then putting them all into the set {gradient set}; said set {gradient set} is a set comprising all sets {{gradient of $u_1(k)$}, ..., {gradient of $u_m(k)$}};

said parameter self-tuning adopts neural network to calculate the parameters to be tuned in the mathematical formula of the control input vector $u(k)=[u_1(k), \ldots, u_m(k)]^T$; the inputs of said neural network comprise at least one of: elements in said set {gradient set}, and elements in set {error set}; said set {error set} comprises at least one of: the error vector $e(k)=[e_1(k), \ldots, e_n(k)]^T$, and error function group of element $e_j(k)$ (j=1, ..., n) in said error vector $e(k)$; said error function group of element $e_j(k)$ comprises at least one of: the accumulation of the j-th error at time k and all previous times $$\sum_{t=0}^{k} e_j(t),$$

the first order backward difference of the j-th error $e_j(k)$ at time k $e_j(k)-e_j(k-1)$, the second order backward difference of the j-th error $e_j(k)$ at time k $e_j(k)-2e_j(k-1)+e_j(k-2)$, and high order backward difference of the j-th error $e_j(k)$ at time k.

While adopting the above-mentioned technical scheme, the invention may adopt or combine the following further technical schemes:

Said j-th error $e_j(k)$ at time k is calculated by the j-th error function; independent variables of said j-th error function comprise the j-th desired system output and the j-th actual system output.

Said j-th error function adopts at least one of: $e_j(k)=y_j^*(k)-y_j(k)$, $e_j(k)=y_j^*(k+1)-y_j(k)$, $e_j(k)=y_j(k)-y_j^*(k)$, and $e_j(k)=y_j(k)-y_j^*(k+1)$, where $y_j^*(k)$ is the j-th desired system output at time k, $y_j^*(k+1)$ is the j-th desired system output at time k+1, and $y_j(k)$ is the j-th actual system output at time k.

Said neural network is BP neural network; said BP neural network adopts a single hidden layer structure, namely a three-layer network structure, comprising an input layer, a single hidden layer, and an output layer.

Aiming at minimizing a system error function, said neural network adopts gradient descent method to update the hidden layer weight coefficients and the output layer weight coefficients, where the gradients are calculated by system error back propagation; independent variables of said system error function comprise at least one of: elements in the error vector $e(k)=[e_1(k), \ldots, e_n(k)]T$, n desired system outputs, and n actual system outputs.

Said system error function is defined as $$\sum_{jy=1}^{n} a_{jy}e_{jy}^2(k) + \sum_{iu=1}^{m} b_{iu}\Delta u_{iu}^2(k),$$

where $e_{jy}(k)$ is the jy-th error at time k, $\Delta u_{iu}(k)=u_{iu}(k)-u_{iu}(k-1)$, $u_{iu}(k)$ is the iu-th control input at time k, $a_{jy}$ and $b_{iu}$ are two constants greater than or equal to zero, jy and iu are two positive integers.

Said controlled plant comprises at least one of: a reactor, a distillation column, a machine, a device, a set of equipment, a production line, a workshop, and a factory.

The hardware platform for running said method comprises at least one of: an industrial control computer, a single chip microcomputer controller, a microprocessor controller, a field programmable gate array controller, a digital signal processing controller, an embedded system controller, a programmable logic controller, a distributed control system, a fieldbus control system, an industrial control system based on internet of things, and an industrial internet control system.

The inventive MIMO different-factor partial-form model-free control method with parameter self-tuning uses different penalty factors or step-size factors for different control inputs in the control input vector, which can solve control problems of strongly nonlinear MIMO systems with different characteristics between control channels widely existing in complex plants. At the same time, parameter self-tuning is proposed to effectively address the problem of time-consuming and cost-consuming when tuning the penalty factors and/or step-size factors. Compared with the existing MIMO partial-form model-free control method with the same-factor structure, the inventive MIMO different-factor partial-form model-free control method with parameter self-tuning has higher control accuracy, stronger stability and wider applicability.

DETAILED DESCRIPTION OF THE INVENTION

The invention is hereinafter described in detail with reference to the embodiments and accompanying drawings. It is to be understood that other embodiments may be utilized and structural changes may be made without departing from the scope of the invention.

Figure 1:
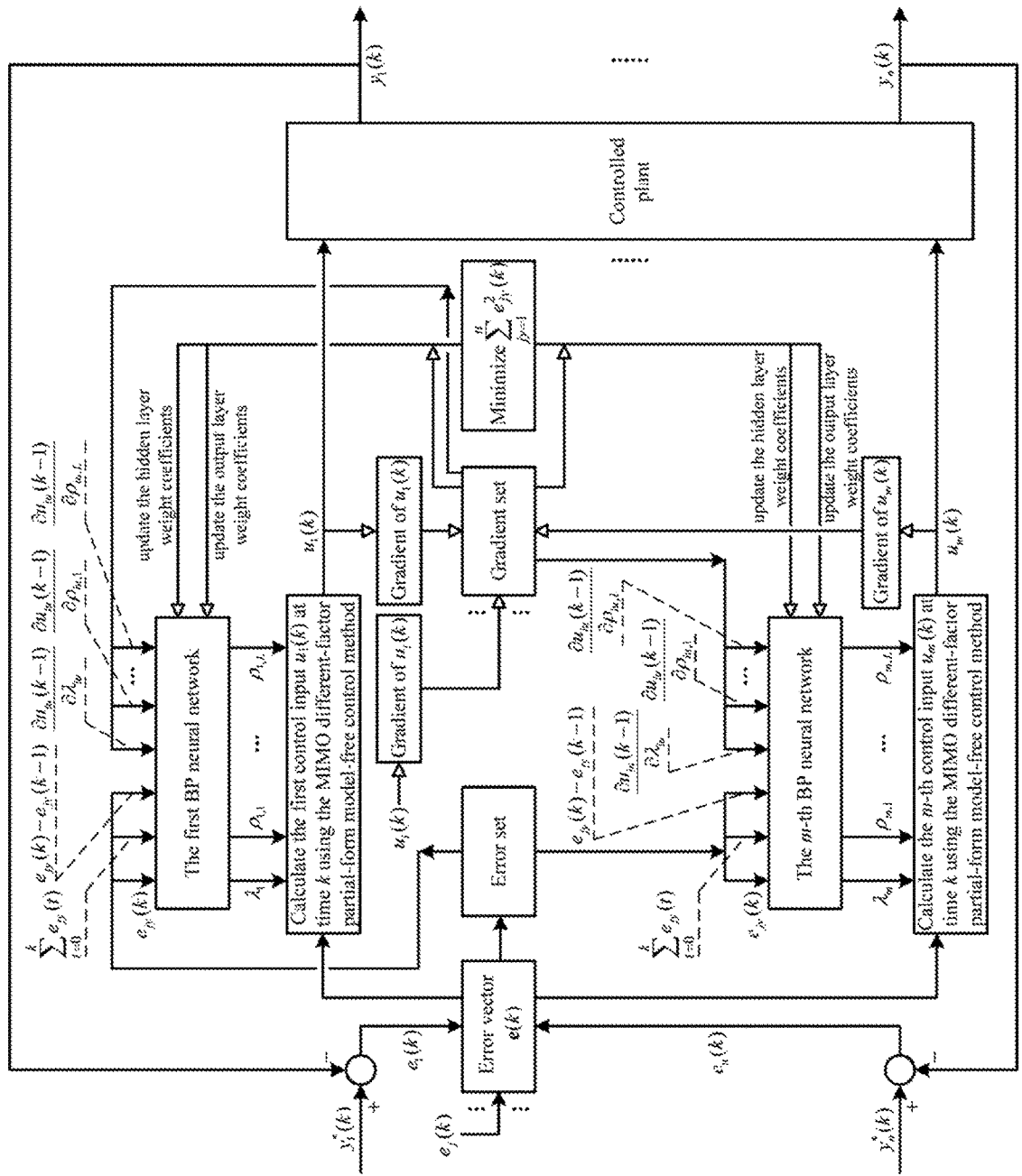
FIG. 1 shows a schematic diagram according to the embodiments of the invention.

FIG. 1 shows a schematic diagram according to the embodiments of the invention. For a MIMO system with m inputs (m is a positive integer greater than 1) and n outputs (n is a positive integer), the MIMO different-factor partial-form model-free control method is adopted to control the system; set the control input length constant of linearization L of the MIMO different-factor partial-form model-free control method where L is a positive integer. For the i-th control input $u_i(k)$ (i=1, . . . , m), the parameters in the mathematical formula for calculating $u_i(k)$ using the MIMO different-factor partial-form model-free adaptive control method include penalty factor $\lambda_i$ and step-size factors $\rho_{i,1}, \ldots, \rho_{i,L}$; choose the parameters to be tuned in the mathematical formula of $u_i(k)$, which are part or all of the parameters in the mathematical formula of $u_i(k)$, including at least one of the penalty factor $\lambda_i$, and step-size factors $\rho_{i,1}, \ldots, \rho_{i,L}$; in the schematic diagram of FIG. 1, the parameters to be tuned in the mathematical formula of all control inputs $u_i(k)$ (i=1, . . . , m) are the penalty factors $\lambda_i$ and step-size factors $\rho_{i,1}, \ldots, \rho_{i,L}$; the parameters to be tuned in the mathematical formula of $u_i(k)$ are calculated by the i-th BP neural network.

Figure 2:
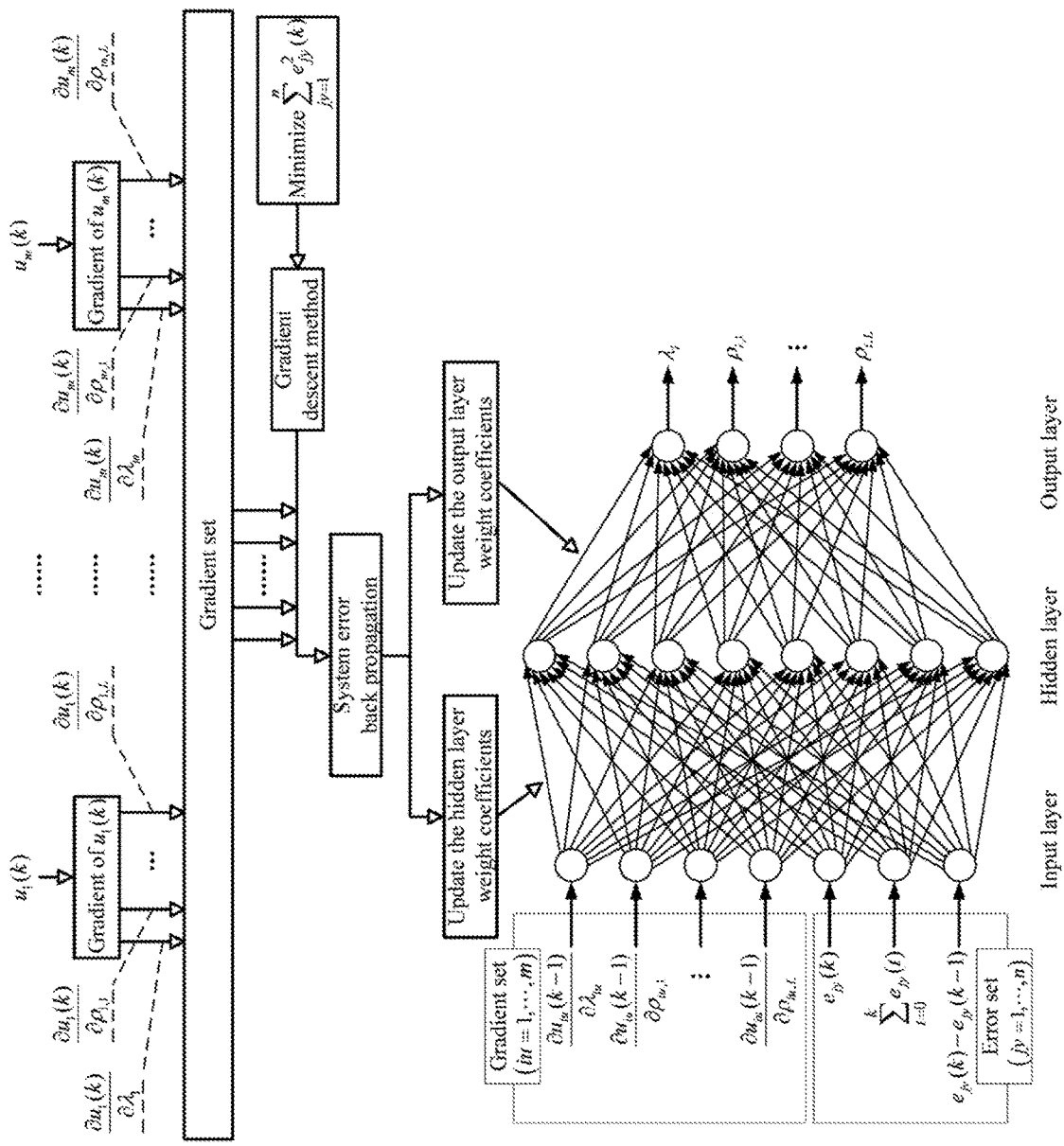
FIG. 2 shows a structure diagram of the i-th BP neural network according to the embodiments of the invention.

FIG. 2 shows a structure diagram of the i-th BP neural network according to the embodiments of the invention; BP neural network can adopt a single hidden layer structure or a multiple hidden layers structure; for the sake of simplicity, BP neural network in the diagram of FIG. 2 adopts the single hidden layer structure, namely a three-layer network structure comprising an input layer, a single hidden layer and an output layer; set the number of input layer nodes, hidden layer nodes and output layer nodes of the i-th BP neural network; the number of input layer nodes of the i-th BP neural network is set to m×(Ly+Lu+1)+n×3, m×(Ly+Lu+1) of which are the elements $$\left\{\frac{\partial u_{iu}(k-1)}{\partial \lambda_{iu}}, \frac{\partial u_{iu}(k-1)}{\partial \rho_{iu,1}}, \ldots, \frac{\partial u_{iu}(k-1)}{\partial \rho_{iu,L}}\right\}$$

(iu=1, . . . , m) in set {gradient set}, and the other n×3 are the elements $$\left\{e_{jy}(k), \sum_{t=0}^{k} e_{jy}(t),\right.$$

$e_{jy}(k)-e_{jy}(k-1)\}$ (jy=1, . . . , n) in set {error set}; the number of output layer nodes of the i-th BP neural network is no less than the number of parameters to be tuned in the mathematical formula of $u_i(k)$; in FIG. 2, the number of parameters to be tuned in the mathematical formula of $u_i(k)$ is L+1, which are the penalty factor $\lambda_i$ and step-size factors $\rho_{i,1}, \ldots, \rho_{i,L}$; detailed updating process of hidden layer weight coefficients and output layer weight coefficients of the i-th BP neural network is as follows: in FIG. 2, aiming at minimizing the system error function $$\sum_{jy=1}^{n} e_{jy}^2(k)$$

with all contributions of n errors comprehensively considered, the gradient descent method is used to update the hidden layer weight coefficients and the output layer weight coefficients of the i-th BP neural network, where the gradients is calculated by system error back propagation; in the process of updating the hidden layer weight coefficients and the output layer weight coefficients of the i-th BP neural network, the elements in set {gradient set}, comprising the set {gradient of $u_1(k)$}, . . . , set {gradient of $u_m(k)$}, are used, namely the gradients at time $$k\left\{\frac{\partial u_{iu}(k)}{\partial \lambda_{iu}}, \frac{\partial u_{iu}(k)}{\partial \rho_{iu_1}}, \ldots, \frac{\partial u_{iu}(k)}{\partial \rho_{iu,L}}\right\}(iu = 1, \ldots, m)$$

of the control input vector $u(k)=[u_1(k), \ldots, u_m(k)]^T$ with respect to parameters to be tuned in their respective mathematical formula.

In combination with the above description of FIG. 1 and FIG. 2, the implementation steps of the technical scheme in the present invention are further explained as follows:

mark the current moment as time k; define the difference between the j-th desired system output $y_j^*(k)$ and the j-th actual system output $y_j(k)$ as the j-th error $e_j(k)$; traverse all values of j in the positive integer interval [1, n] and obtain the error vector $e(k)=[e_1(k), \ldots, e_n(k)]^T$, then put them all into the set {error set}; take the elements $$\left\{\frac{\partial u_{iu}(k)}{\partial \lambda_{iu}}, \frac{\partial u_{iu}(k)}{\partial \rho_{iu_1}}, \ldots, \frac{\partial u_{iu}(k)}{\partial \rho_{iu,L}}\right\}(iu = 1, \ldots, m)$$

in set {gradient set} and the elements $$\left\{e_{jy}(k), \sum_{t=0}^{k} e_{jy}(t), e_{jy}(k) - e_{jy}(k-1)\right\}(jy = 1, \ldots, n)$$

in set {error set} as the inputs of the i-th BP neural network; obtain the parameters to be tuned in the mathematical formula for calculating $u_i(k)$ using the MIMO different-factor partial-form model-free control method by the output layer of the i-th BP neural network through forward propagation; based on the error vector e(k) and the parameters to be tuned in the mathematical formula of $u_i(k)$, calculate the i-th control input $u_i(k)$ at time k using the MIMO different-factor partial-form model-free adaptive control method; traverse all values of i in the positive integer interval [1, m] and obtain the control input vector $u(k)=[u_1(k), \ldots, u_m(k)]^T$ at time k; for $u_i(k)$ in the control input vector u(k), calculate all partial derivatives of $u_i(k)$ with respect to the parameters to be tuned in the mathematical formula, and put them all into the set {gradient of $u_i(k)$}; traverse all values of i in the positive integer interval [1, m] and obtain the set {gradient of $u_1(k)$}, . . . , set {gradient of $u_m(k)$}, and put them all into the set {gradient set}; then, aiming at minimizing the system error function $$\sum_{jy=1}^{n} e_{jy}^2(k)$$

with all contributions of n errors comprehensively considered and using the gradients $$\left\{\frac{\partial u_{iu}(k)}{\partial \lambda_{iu}}, \frac{\partial u_{iu}(k)}{\partial \rho_{iu,1}}, \ldots, \frac{\partial u_{iu}(k)}{\partial \rho_{iu,L}}\right\}$$

(iu=1, . . . , m) in set {gradient set}, update the hidden layer weight coefficients and the output layer weight coefficients of the i-th BP neural network using the gradient descent method, where the gradients is calculated by system error back propagation; traverse all values of i in the positive integer interval [1, m] and update the hidden layer weight coefficients and the output layer weight coefficients of all m BP neural networks; obtain the n actual system outputs at next time by applying the control input vector u(k) into the controlled plant, and then repeat the steps described in this paragraph for controlling the MIMO system at next sampling time.

Two exemplary embodiments of the invention are given for further explanation.

The First Exemplary Embodiment

A two-input two-output MIMO system, which has the complex characteristics of non-minimum phase nonlinear system, is adopted as the controlled plant, and it belongs to the MIMO system that is particularly difficult to control:

$$y_1(k) = \frac{2.5y_1(k-1)y_1(k-2)}{1 + y_1^2(k-1) + y_2^2(k-2) + y_1^2(k-3)} +$$

$$0.09u_1(k-1)u_1(k-2) + 1.2u_1(k-1) + 1.6u_1(k-3) + 0.5u_2(k-1) +$$

$$0.7\sin(0.5(y_1(k-1) + y_1(k-2)))\cos(0.5(y_1(k-1) + y_1(k-2)))$$

$$y_2(k) = \frac{5y_2(k-1)y_2(k-2)}{1 + y_2^2(k-1) + y_1^2(k-2) + y_2^2(k-3)} +$$

$$u_2(k-1) + 1.1u_2(k-2) + 1.4u_2(k-3) + 0.5u_1(k-1)$$

The desired system outputs y*(k) are as follows:

$$y_1^*(k)=5\sin(k/50)+2\cos(k/20)$$

$$y_2^*(k)=2\sin(k/50)+5\cos(k/20)$$

In this embodiment, m=n=2.

The control input length constant of linearization L is usually set according to the complexity of the controlled plant and the actual control performance, generally between 1 and 10, while small Lu will affect the control performance and large L will lead to massive calculation, so it is usually set to 3 or 5; in this embodiment, L=3.

In view of the above exemplary embodiment, five experiments are carried out for comparison and verification. In order to compare the control performance of the five experiments clearly, root mean square error (RMSE) is adopted as the control performance index for evaluation:

$$RMSE(e_j)=\sqrt{\frac{1}{N}\sum_{k=1}^{N}e_j^2(k)}$$

where $e_j(k)=y_j^*(k)-y_j(k)$, $y_j^*(k)$ is the j-th desired system output at time k, $y_j(k)$ is the j-th actual system output at time k. The smaller the value of $RMSE(e_j)$ is, the smaller the error between the j-th actual system output and the j-th desired system output is, and the better the control performance gets.

The hardware platform for running the inventive control method is the industrial control computer.

Figure 3:
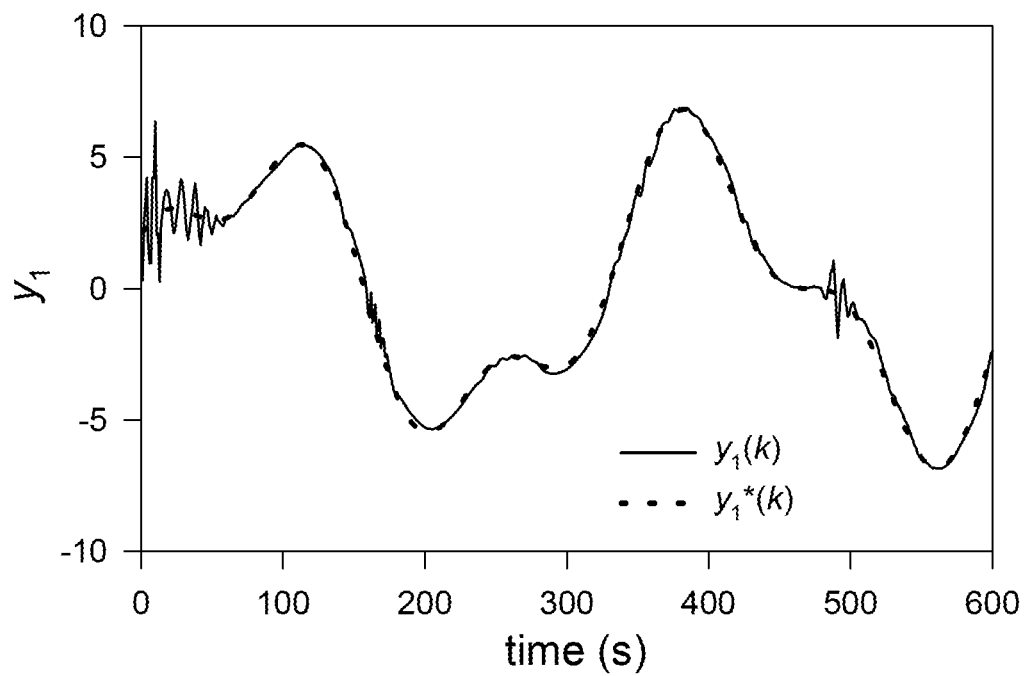
FIG. 3 shows the tracking performance of the first system output when controlling the two-input two-output MIMO system in the first exemplary embodiment by using the inventive MIMO different-factor partial-form model-free control method with parameter self-tuning.
Figure 4:
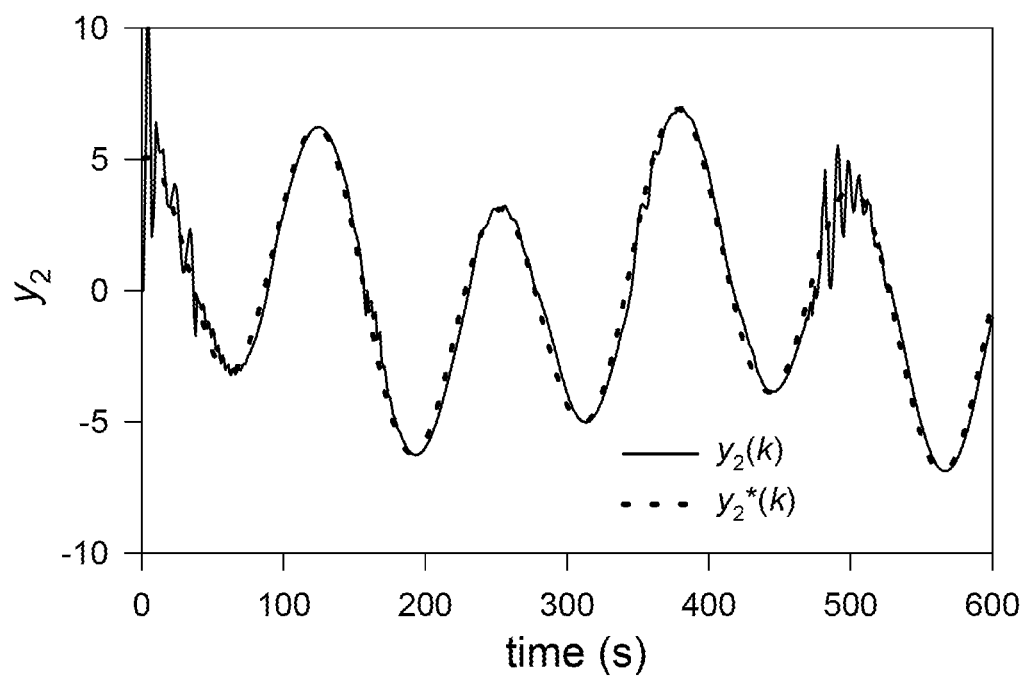
FIG. 4 shows the tracking performance of the second system output when controlling the two-input two-output MIMO system in the first exemplary embodiment by using the inventive MIMO different-factor partial-form model-free control method with parameter self-tuning.
Figure 5:
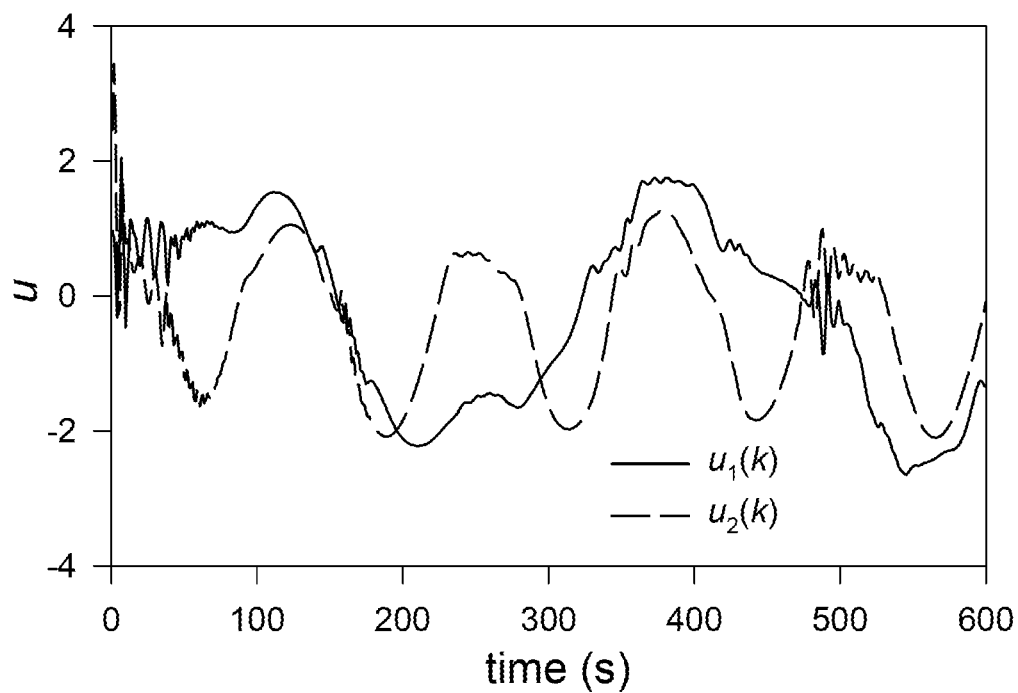
FIG. 5 shows the control inputs when controlling the two-input two-output MIMO system in the first exemplary embodiment by using the inventive MIMO different-factor partial-form model-free control method with parameter self-tuning.
Figure 6:
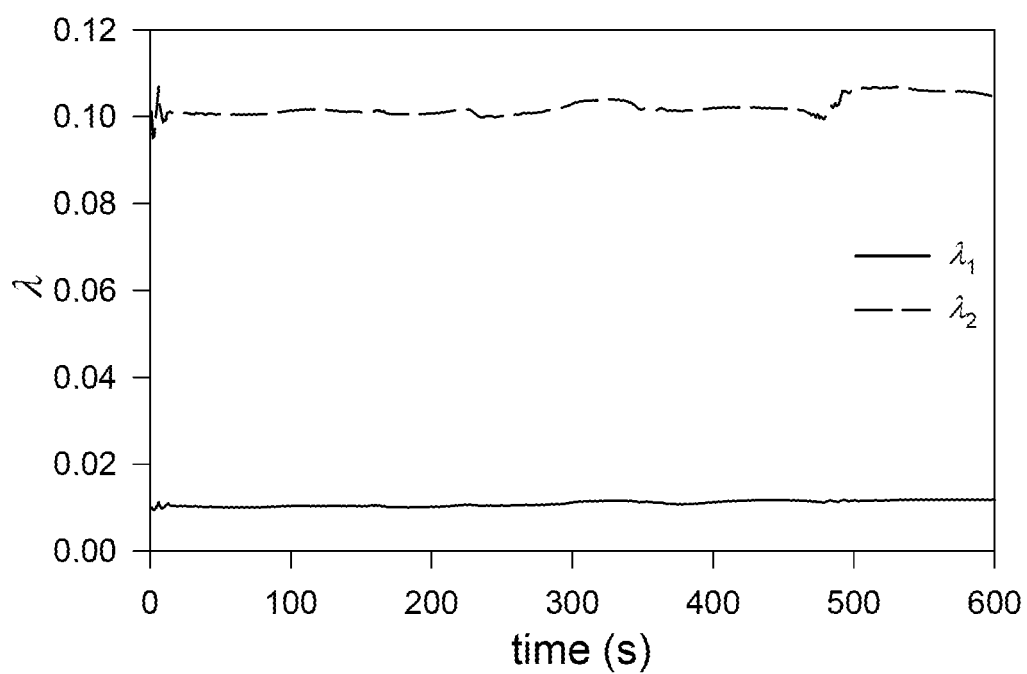
FIG. 6 shows the changes of penalty factor when controlling the two-input two-output MIMO system in the first exemplary embodiment by using the inventive MIMO different-factor partial-form model-free control method with parameter self-tuning.
Figure 7:
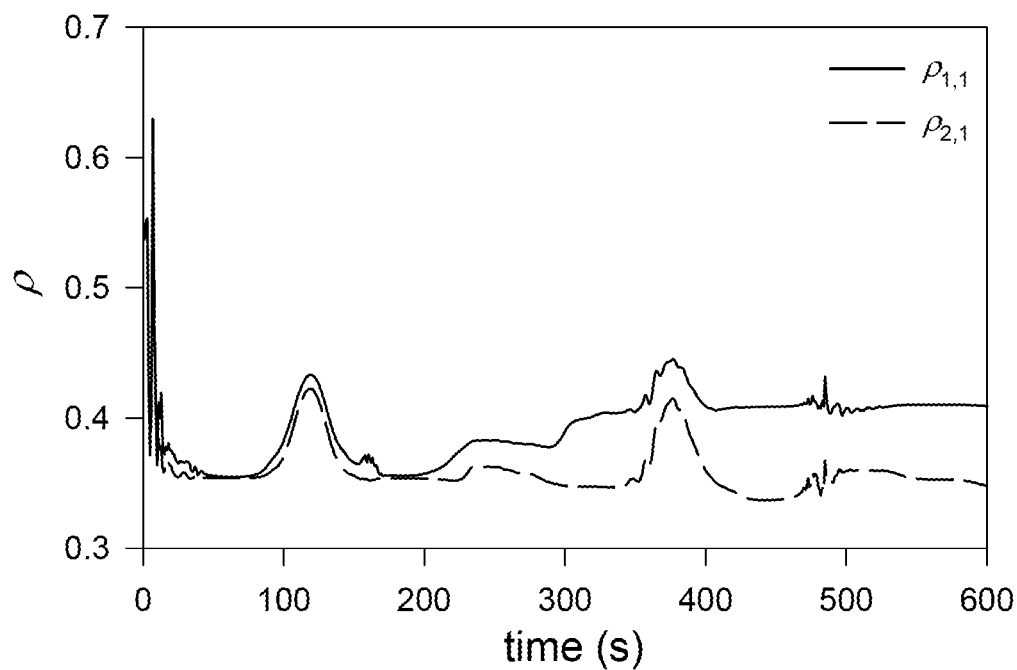
FIG. 7 shows the changes of the first step-size factor when controlling the two-input two-output MIMO system in the first exemplary embodiment by using the inventive MIMO different-factor partial-form model-free control method with parameter self-tuning.
Figure 8:
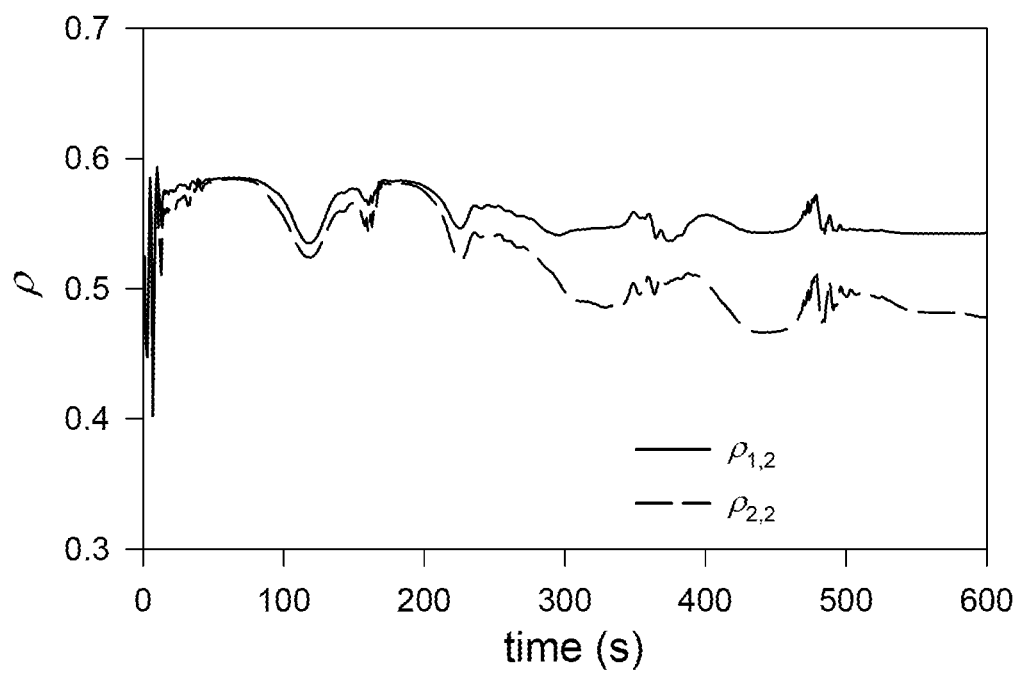
FIG. 8 shows the changes of the second step-size factor when controlling the two-input two-output MIMO system in the first exemplary embodiment by using the inventive MIMO different-factor partial-form model-free control method with parameter self-tuning.
Figure 9:
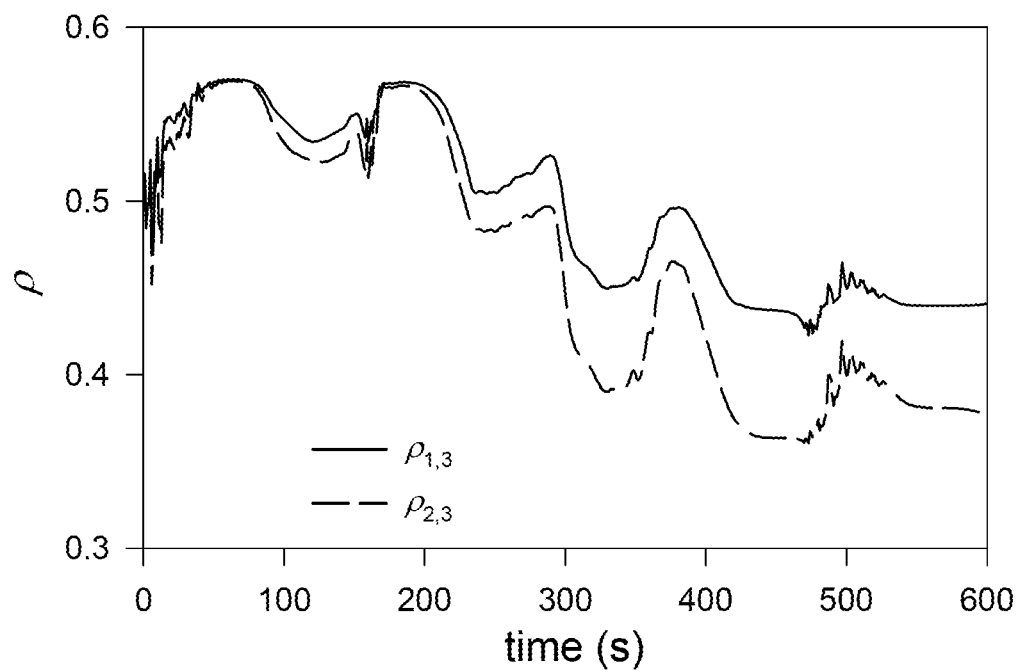
FIG. 9 shows the changes of the third step-size factor when controlling the two-input two-output MIMO system in the first exemplary embodiment by using the inventive MIMO different-factor partial-form model-free control method with parameter self-tuning.

The first experiment (RUN1): the number of input layer nodes of the first BP neural network and the second BP neural network is both set to 14, 8 of which are the elements $$\left\{\frac{\partial u_1(k-1)}{\partial \lambda_1}, \frac{\partial u_1(k-1)}{\partial \rho_{1,1}}, \frac{\partial u_1(k-1)}{\partial \rho_{1,2}}, \frac{\partial u_1(k-1)}{\partial \rho_{1,3}}, \frac{\partial u_2(k-1)}{\partial \lambda_2}, \frac{\partial u_2(k-1)}{\partial \rho_{2,1}}, \frac{\partial u_2(k-1)}{\partial \rho_{2,2}}, \frac{\partial u_2(k-1)}{\partial \rho_{2,3}}\right\}$$

in set {gradient set}, and the other 6 are the elements $$\left\{e_1(k), \sum_{t=0}^{k}e_1(t), e_1(k)-e_1(k-1), e_2(k), \sum_{t=0}^{k}e_2(t), e_2(k)-e_2(k-1)\right\}$$

in set {error set}; the number of hidden layer nodes of the first BP neural network and the second BP neural network is both set to 6; the number of output layer nodes of the first BP neural network and the second BP neural network is both set to 4, where the first BP neural network outputs penalty factor $\lambda_1$ and step-size factors $\rho_{1,1}, \rho_{1,2}, \rho_{1,3}$, and the second BP neural network outputs penalty factor $\lambda_2$ and step-size factors $\rho_{2,1}, \rho_{2,2}, \rho_{2,3}$; the inventive MIMO different-factor partial-form model-free control method with parameter self-tuning is adopted to control the above two-input two-output MIMO system; the tracking performance of the first system output and second system output are shown in FIG. 3 and FIG. 4, respectively, and the control inputs are shown in FIG. 5; FIG. 6 shows the changes of penalty factor, FIG. 7 shows the changes of the first step-size factor, FIG. 8 shows the changes of the second step-size factor, and FIG. 9 shows the changes of the third step-size factor; evaluate the control method from the control performance indexes: the RMSE($e_1$) of the first system output in FIG. 3 is 0.3781, and the RMSE($e_2$) of the second system output in FIG. 4 is 0.7201; evaluate the control method from the different-factor characteristic: the changes of penalty factor in FIG. 6 basically do not overlap, indicating that the different-factor characteristic for penalty factor is significant when controlling the above two-input two-output MIMO system, and the changes of step-size factors in FIG. 7, 8, 9 basically do not overlap, indicating that the different-factor characteristic for step-size factors are significant when controlling the above two-input two-output MIMO system.

The second experiment (RUN2): the number of input layer nodes of the first BP neural network and the second BP neural network is both set to 8, all of which are the elements $$\left\{\frac{\partial u_1(k-1)}{\partial \lambda_1}, \frac{\partial u_1(k-1)}{\partial \rho_{1,1}}, \frac{\partial u_1(k-1)}{\partial \rho_{1,2}}, \frac{\partial u_1(k-1)}{\partial \rho_{1,3}}, \frac{\partial u_2(k-1)}{\partial \lambda_2}, \frac{\partial u_2(k-1)}{\partial \rho_{2,1}}, \frac{\partial u_2(k-1)}{\partial \rho_{2,2}}, \frac{\partial u_2(k-1)}{\partial \rho_{2,3}}\right\}$$

in set {gradient set}; the number of hidden layer nodes of the first BP neural network and the second BP neural network is both set to 6; the number of output layer nodes of the first BP neural network and the second BP neural network is both set to 4, where the first BP neural network outputs penalty factor $\lambda_1$ and step-size factors $\rho_{1,1}, \rho_{1,2}, \rho_{1,3}$, and the second BP neural network outputs penalty factor $\lambda_2$ and step-size factors $\rho_{2,1}, \rho_{2,2}, \rho_{2,3}$; the inventive MIMO different-factor partial-form model-free control method with parameter self-tuning is adopted to control the above two-input two-output MIMO system; evaluate the control method from the control performance indexes: the RMSE($e_1$) of the first system output is 0.4761, and the RMSE($e_2$) of the second system output is 0.8876.

The third experiment (RUN3): the number of input layer nodes of the first BP neural network and the second BP neural network is both set to 6, all of which are the elements $$\left\{e_1(k), \sum_{t=0}^{k}e_1(t), e_1(k)-e_1(k-1), e_2(k), \sum_{t=0}^{k}e_2(t), e_2(k)-e_2(k-1)\right\}$$

in set {error set}; the number of hidden layer nodes of the first BP neural network and the second BP neural network is both set to 6; the number of output layer nodes of the first BP neural network and the second BP neural network is set to 4, where the first BP neural network outputs penalty factor $\lambda_1$ and step-size factors, $\rho_{1,1}, \rho_{1,2}, \rho_{1,3}$, and the second BP neural network outputs penalty factor $\lambda_2$ and step-size factors $\rho_{2,1}, \rho_{2,2}, \rho_{2,3}$; the inventive MIMO different-factor partial-form model-free control method with parameter self-tuning is adopted to control the above two-input two-output MIMO system; evaluate the control method from the control performance indexes: the RMSE($e_1$) of the first system output is 0.5256, and the RMSE($e_2$) of the second system output is 1.1019.

The fourth experiment (RUN4): the penalty factors $\lambda_1, \lambda_2$ and step-size factors $\rho_{1,1}, \rho_{1,2}, \rho_{1,3}$ are fixed, and only the step-size factors $\rho_{2,1}, \rho_{2,2}, \rho_{2,3}$ for the second control input are chosen for the parameters to be tuned, therefore, only one BP neural network is adopted here; the number of input layer nodes of the BP neural network is set to 6, all of which are the elements $$\left\{e_1(k), \sum_{t=0}^{k} e_1(t), e_1(k) - e_1(k-1), e_2(k), \sum_{t=0}^{k} e_2(t), e_2(k) - e_2(k-1)\right\}$$

in set {error set}; the number of hidden layer nodes of the BP neural network is set to 6; the number of output layer nodes of the BP neural network is set to 3, where the outputs are step-size factors $\rho_{2,1}$, $\rho_{2,2}$, $\rho_{2,3}$; the inventive MIMO different-factor partial-form model-free control method with parameter self-tuning is adopted to control the above two-input two-output MIMO system; evaluate the control method from the control performance indexes: the RMSE ($e_1$) of the first system output is 0.5876, and the RMSE($e_2$) of the second system output is 1.1861.

Figure 10:
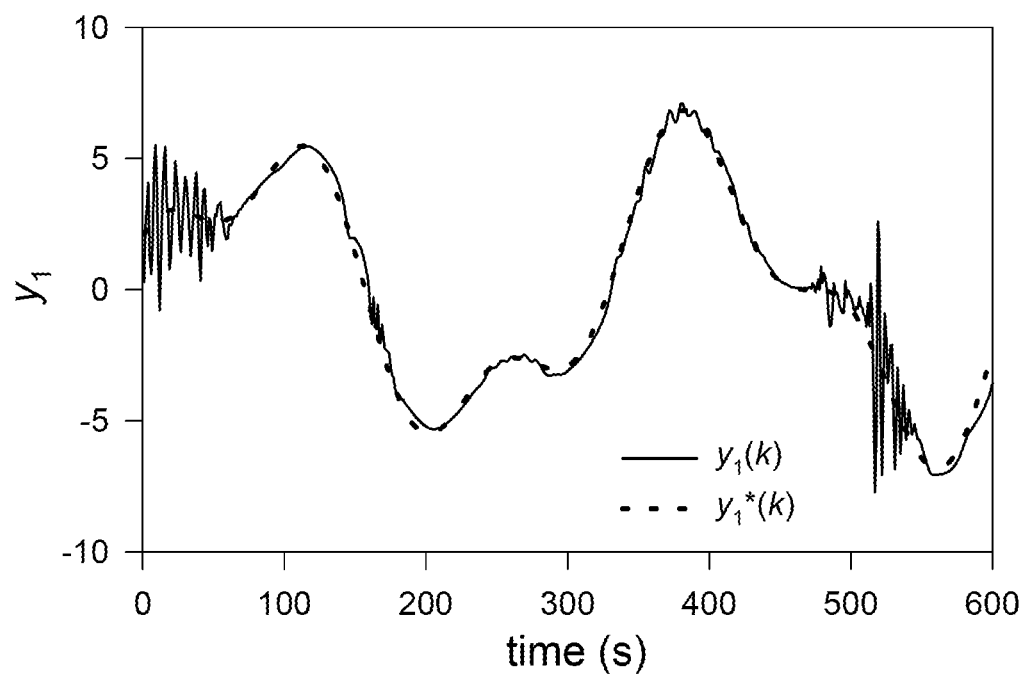
FIG. 10 shows the tracking performance of the first system output when controlling the two-input two-output MIMO system in the first exemplary embodiment by using the existing MIMO partial-form model-free control method with the same-factor structure.
Figure 11:
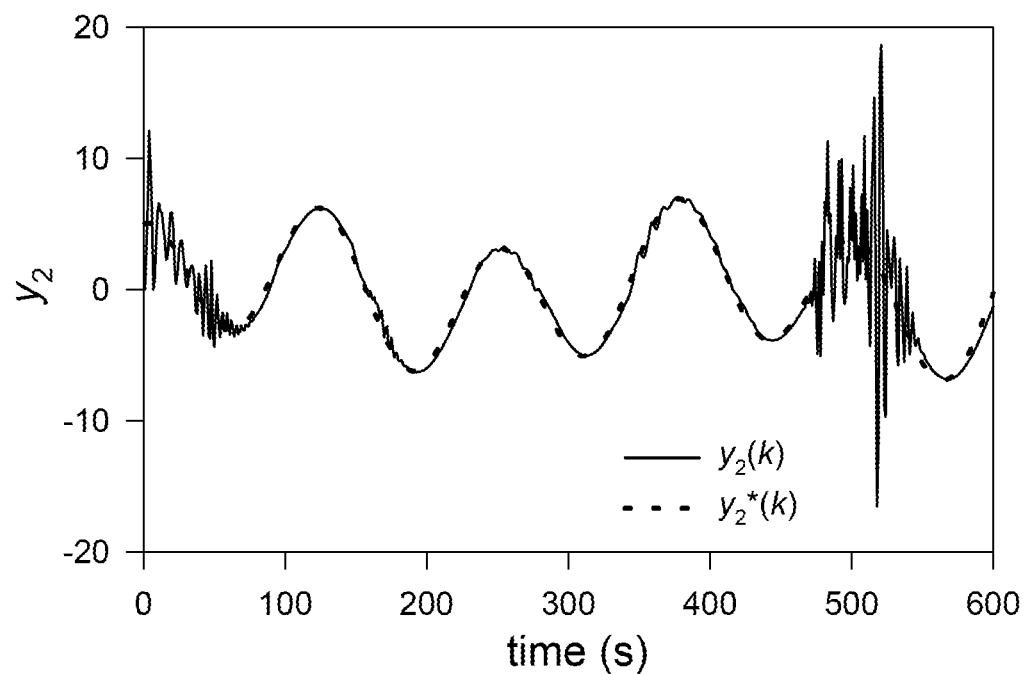
FIG. 11 shows the tracking performance of the second system output when controlling the two-input two-output MIMO system in the first exemplary embodiment by using the existing MIMO partial-form model-free control method with the same-factor structure.
Figure 12:
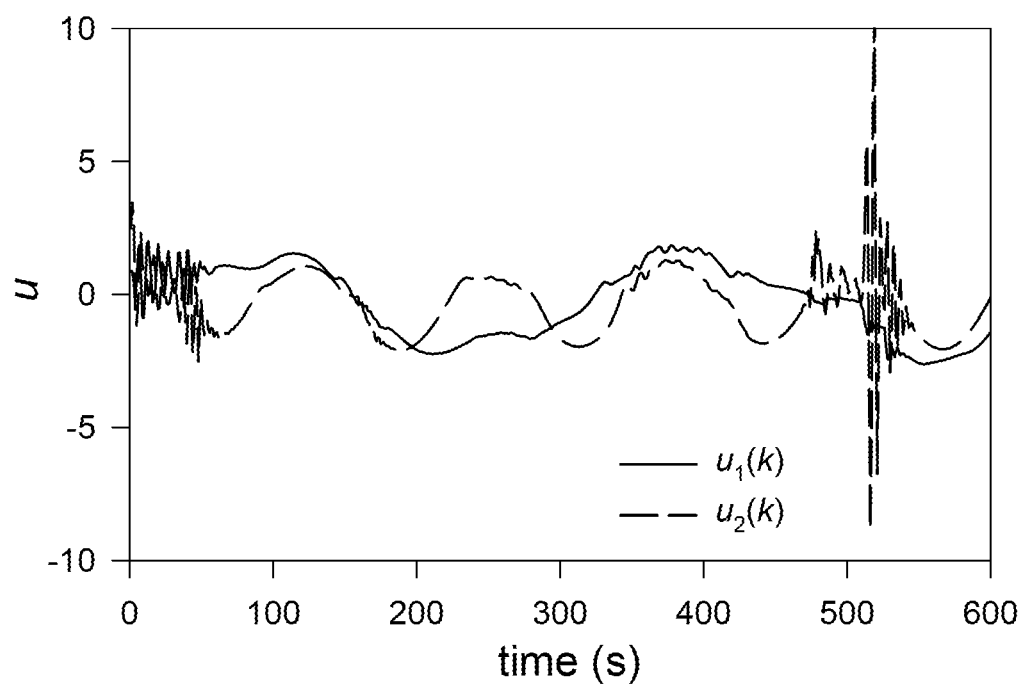
FIG. 12 shows the control inputs when controlling the two-input two-output MIMO system in the first exemplary embodiment by using the existing MIMO partial-form model-free control method with the same-factor structure.

The fifth experiment (RUN5): the existing MIMO partial-form model-free control method is adopted control the above two-input two-output MIMO system; set the penalty factor $\lambda=0.01$, and the step-size factors $\rho_1=\rho_2=\rho_3=0.50$; the tracking performance of the first system output and the second system output are shown in FIG. 10 and FIG. 11, respectively, and the control inputs are shown in FIG. 12; evaluate the control method from the control performance indexes: the RMSE($e_1$) of the first system output is 0.7235, and the RMSE($e_2$) of the second system output is 2.1182.

The comparison results of control performance indexes of the five experiments are shown in Table 1; the results of the first experiment to the fourth experiment (RUN1, RUN2, RUN3, RUN4) using the inventive control method are superior to those of the fifth experiment (RUN5) using the existing MIMO partial-form model-free control method with the same-factor structure, and have a significant improvement, indicating that the inventive MIMO different-factor partial-form model-free control method with parameter self-tuning has higher control accuracy, stronger stability and wider applicability.

TABLE 1

| Comparison Results of The Control Performance | | | | |
|---|---|---|---|---|
| | The first system output | | The second system output | |
| | RMSE($e_1$) | Improvement | RMSE($e_2$) | Improvement |
| RUN1 | 0.3781 | 47.740% | 0.7201 | 66.004% |
| RUN2 | 0.4761 | 34.195% | 0.8876 | 58.096% |
| RUN3 | 0.5256 | 27.353% | 1.1019 | 47.979% |
| RUN4 | 0.5876 | 18.784% | 1.1861 | 44.004% |
| RUN5 | 0.7235 | Baseline | 2.1182 | Baseline |

The Second Exemplary Embodiment

A coal mill is a very important set of equipment that pulverizes raw coal into fine powder, providing fine powder for the pulverized coal furnace. Realizing the control of coal mill with high accuracy, strong stability and wide applicability is of great significance to ensure the safe and stable operation of thermal power plant.

The two-input two-output MIMO system of coal mill, which has the complex characteristics of nonlinearity, strong coupling and time-varying, is adopted as the controlled plant, and it belongs to the MIMO system that is particularly difficult to control. Two control inputs $u_1(k)$ and $u_2(k)$ of the coal mill are hot air flow (controlled by the opening of hot air gate) and recycling air flow (controlled by the opening of recycling air gate), respectively. Two system outputs $y_1(k)$ and $y_2(k)$ of the coal mill are outlet temperature (° C.) and inlet negative pressure (Pa), respectively. The initial conditions of the coal mill are: $u_1(0)=80\%$, $u_2(0)=40\%$, $y_1(0)=70°$ C., $y_2(0)=-400$ Pa. At the 50th second, in order to meet the needs of on-site conditions adjustment in thermal power plant, the desired system output $y_1^*(50)$ is adjusted from 70° C. to 80° C., and the desired system output $y_2^*(k)$ is required to remain unchanged at −400 Pa. In view of the above typical conditions in the thermal power plant, two experiments are carried out for comparison and verification. In this embodiment, m=n=2, the control input length constant of linearization L is set to 4. The hardware platform for running the inventive control method is the industrial control computer.

Figure 13:
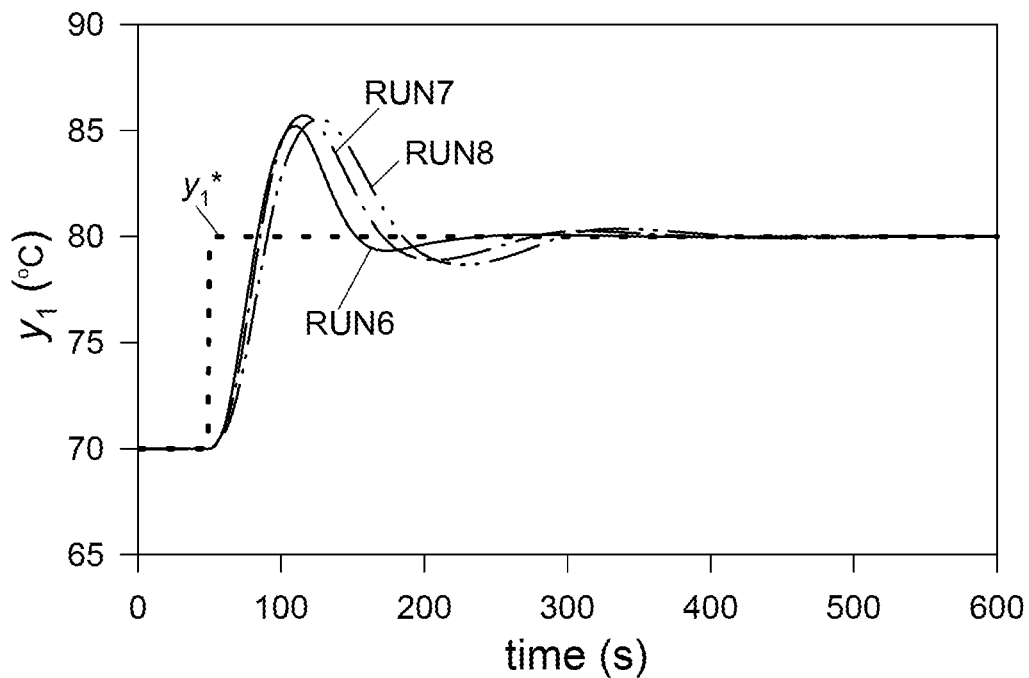
FIG. 13 shows the tracking performance of the first system output when controlling the two-input two-output MIMO system of coal mill in the second exemplary embodiment.
Figure 14:
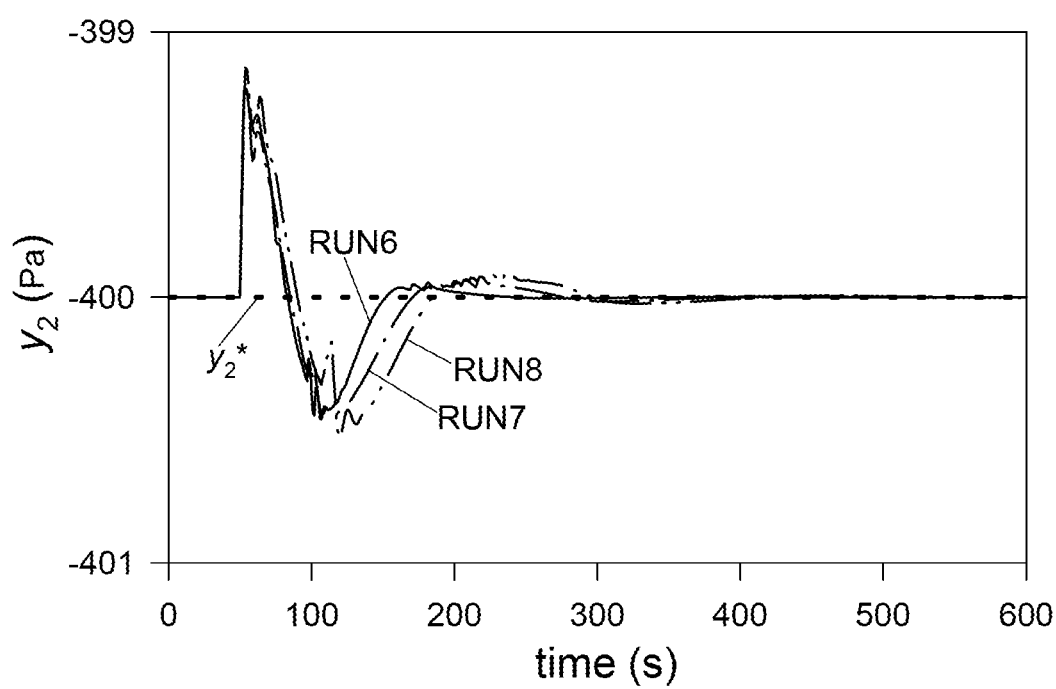
FIG. 14 shows the tracking performance of the second system output when controlling the two-input two-output MIMO system of coal mill in the second exemplary embodiment.
Figure 15:
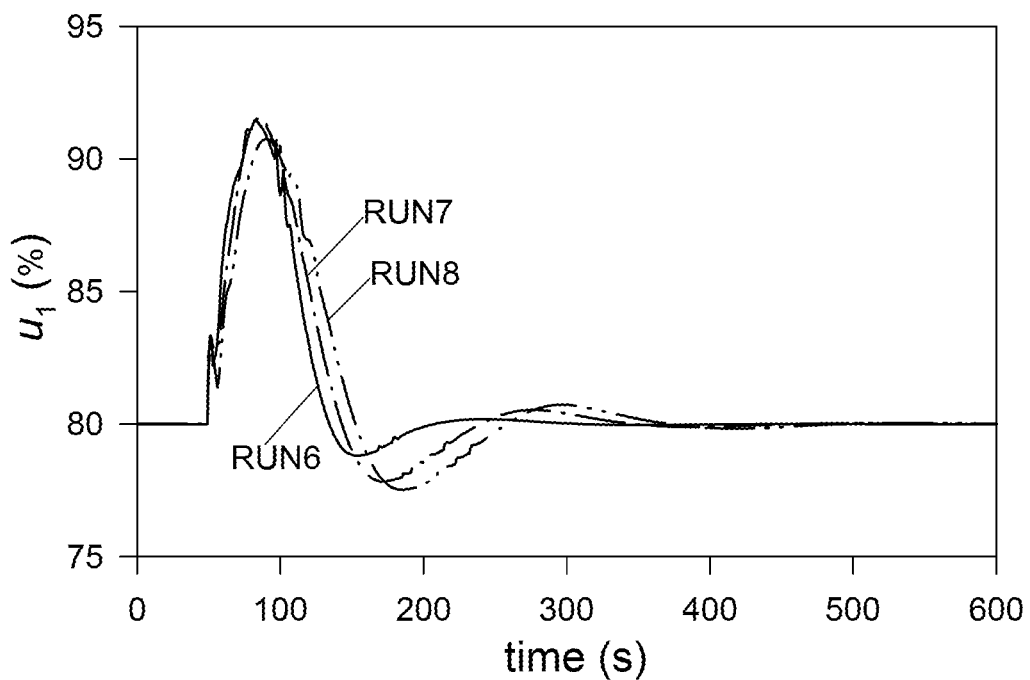
FIG. 15 shows the first control input when controlling the two-input two-output MIMO system of coal mill in the second exemplary embodiment.
Figure 16:
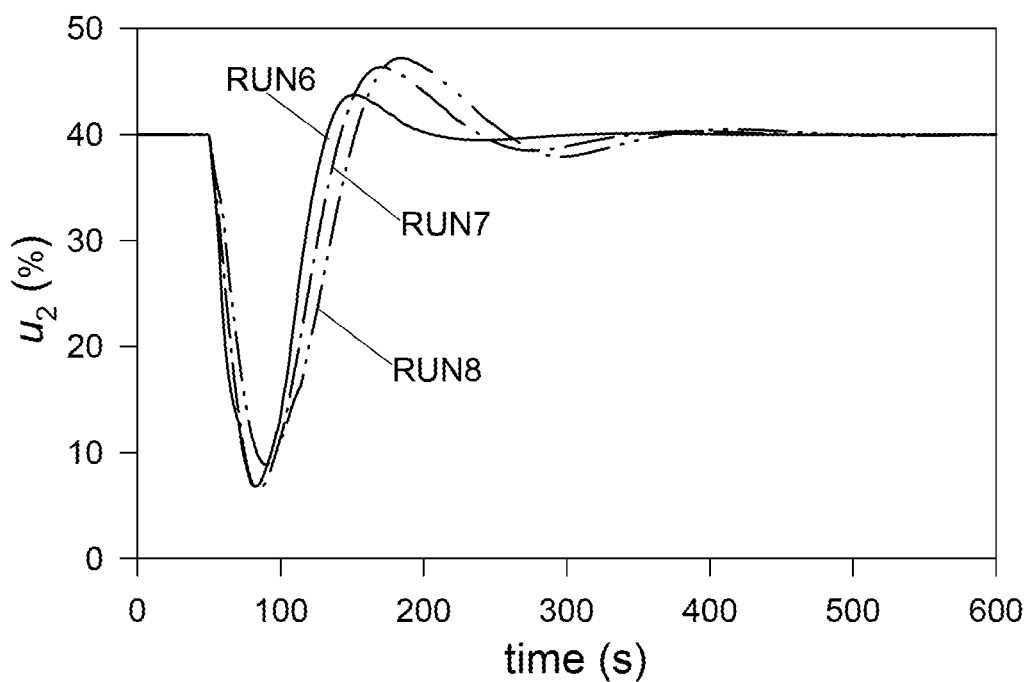
FIG. 16 shows the second control input when controlling the two-input two-output MIMO system of coal mill in the second exemplary embodiment.
Figure 17:
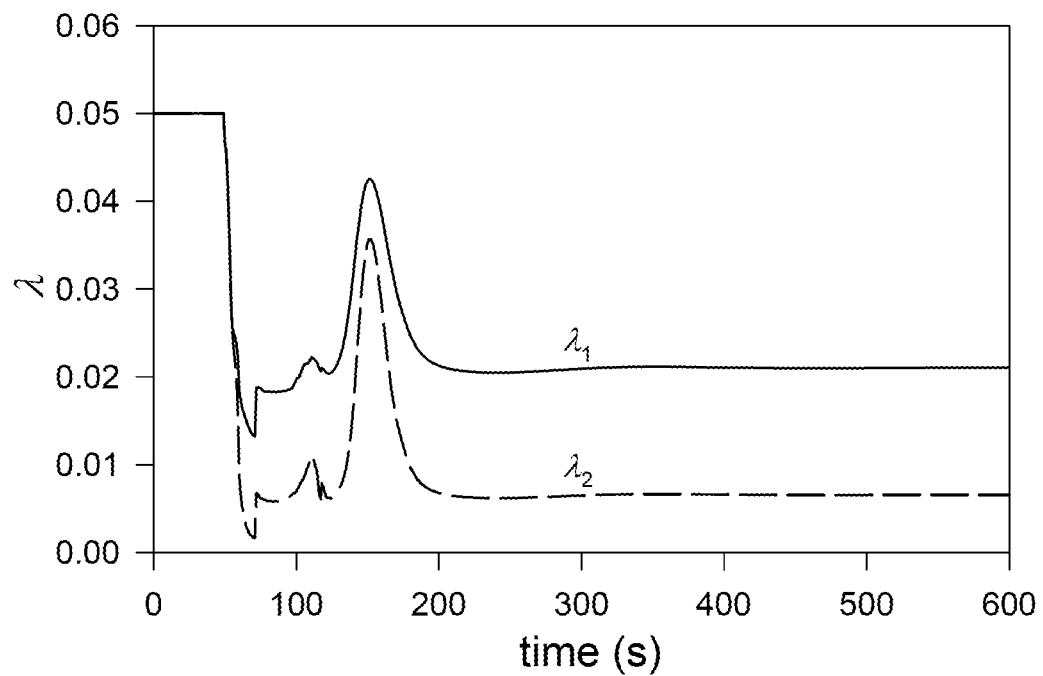
FIG. 17 shows the changes of penalty factors $\lambda_1$ and $\lambda_2$ for two control inputs when controlling the two-input two-output MIMO system of coal mill in the second exemplary embodiment.
Figure 18:
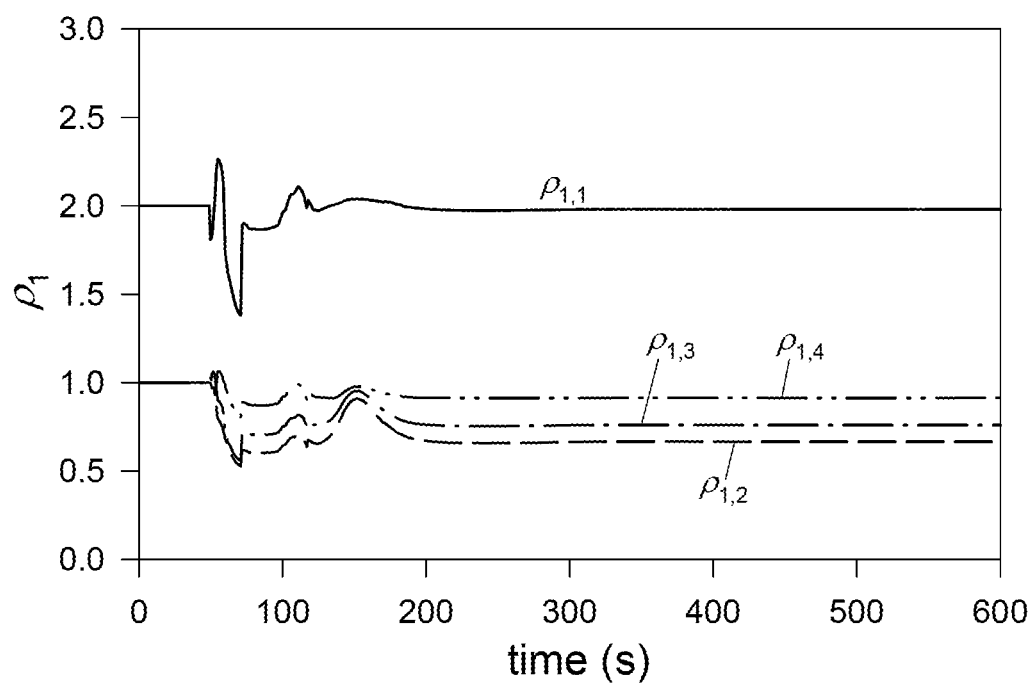
FIG. 18 shows the changes of step-size factors $\rho_{1,1}$, $\rho_{1,2}$, $\rho_{1,3}$, $\rho_{1,4}$ for the first control input when controlling the two-input two-output MIMO system of coal mill in the second exemplary embodiment.
Figure 19:
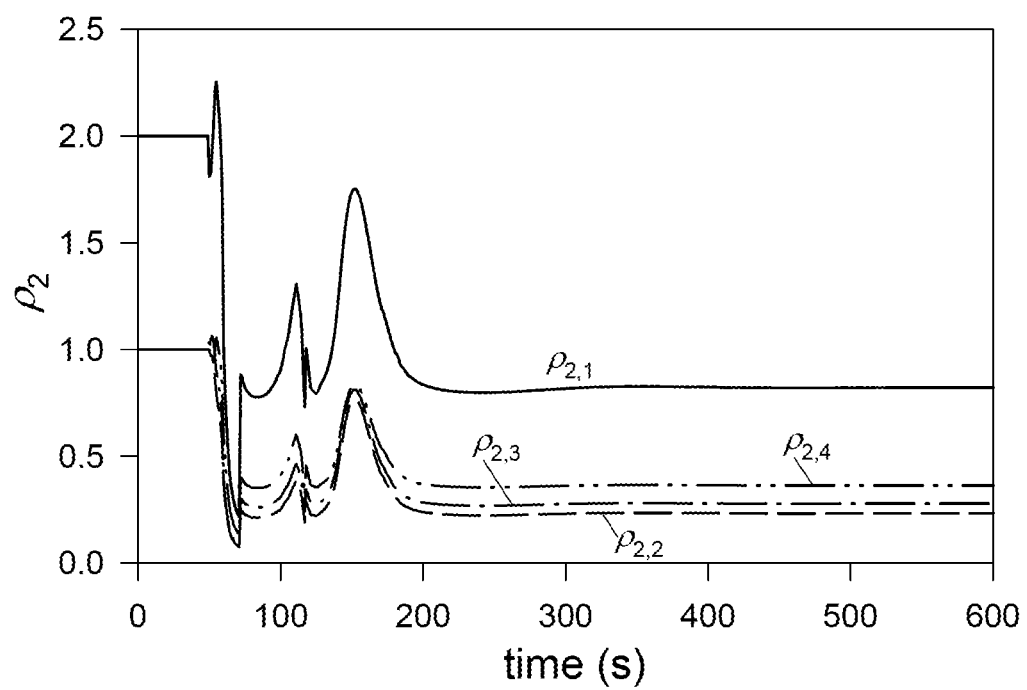
FIG. 19 shows the changes of step-size factors $\rho_{2,1}$, $\rho_{2,2}$, $\rho_{2,3}$, $\rho_{2,4}$ for the second control input when controlling the two-input two-output MIMO system of coal mill in the second exemplary embodiment.

The sixth experiment (RUN6): the number of input layer nodes of the first BP neural network and the second BP neural network is both set to 16, 10 of which are the elements $$\left\{\frac{\partial u_1(k-1)}{\partial \lambda_1}, \frac{\partial u_1(k-1)}{\partial \rho_{1,1}}, \frac{\partial u_1(k-1)}{\partial \rho_{1,2}}, \frac{\partial u_1(k-1)}{\partial \rho_{1,3}}, \frac{\partial u_1(k-1)}{\partial \rho_{1,4}}, \right.$$
$$\left. \frac{\partial u_2(k-1)}{\partial \lambda_2}, \frac{\partial u_2(k-1)}{\partial \rho_{2,1}}, \frac{\partial u_2(k-1)}{\partial \rho_{2,2}}, \frac{\partial u_2(k-1)}{\partial \rho_{2,3}}, \frac{\partial u_2(k-1)}{\partial \rho_{2,4}}\right\}$$

in set {gradient set}, and the other 6 are the elements $$\left\{e_1(k), \sum_{t=0}^{k} e_1(t), e_1(k) - e_1(k-1), e_2(k), \sum_{t=0}^{k} e_2(t), e_2(k) - e_2(k-1)\right\}$$

in set {error set}; the number of hidden layer nodes of the first BP neural network and the second BP neural network is both set to 20; the number of output layer nodes of the first BP neural network and the second BP neural network is both set to 5, where the first BP neural network outputs penalty factor $\lambda_1$ and step-size factors $\rho_{1,1}$, $\rho_{1,2}$, $\rho_{1,3}$, $\rho_{1,4}$, and the second BP neural network outputs penalty factor $\lambda_2$ and step-size factors $\rho_{1,2}$, $\rho_{1,2}$, $\rho_{2,3}$, $\rho_{2,4}$; the inventive MIMO different-factor partial-form model-free control method with parameter self-tuning is adopted to control the above two-input two-output MIMO system; the tracking performance of the first output is shown as RUN6 in FIG. 13, the tracking performance of the second output is shown as RUN6 in FIG. 14, the first control input is shown as RUN6 in FIG. 15, and the second control input is shown as RUN6 in FIG. 16; FIG. 17 shows the changes of penalty factors $\lambda_1$ and $\lambda_2$ for two control inputs, FIG. 18 shows the changes of step-size factors $\rho_{1,1}$, $\rho_{1,2}$, $\rho_{1,3}$, $\rho_{1,4}$ for the first control input, and FIG. 19 shows the changes of step-size factors $\rho_{2,1}$, $\beta_{2,2}$, $\rho_{2,3}$, $\rho_{2,4}$ for the second control input; evaluate the control method from the control performance indexes: the RMSE ($e_1$) of the first system output, RUN6 in FIG. 13, is 2.0549, and the RMSE($e_2$) of the second system output, RUN6 in FIG. 14, is 0.1554; evaluate the control method from the different-factor characteristic: the changes of penalty factors for two control inputs in FIG. 17 do not overlap at all, indicating that the different-factor characteristic for penalty factor is significant when controlling the above two-input two-output MIMO system, and the changes of step-size factors for two control inputs in FIG. 18 and FIG. 19 basically do not overlap, indicating that the different-factor characteristic for step-size factors are significant when controlling the above two-input two-output MIMO system.

The seventh experiment (RUN7): the MIMO different-factor partial-form model-free control method with fixed parameters is adopted to control the above two-input two-output MIMO system; set the parameters value for calculating the first control input: the penalty factor $\lambda_1=0.05$, the step-size factors $\rho_{1,1}=1.98$, $\rho_{1,2}=1.32$, $\rho_{1,3}=1.14$, $\rho_{1,4}=1.11$; set the parameters value for calculating the second control input: the penalty factor $\lambda_2=0.05$, the step-size factors $\rho_{2,1}=2.14$, $\beta_{2,2}=1.39$, $\beta_{2,3}=1.23$, $\beta_{2,4}=1.19$; the tracking performance of the first system output is shown as RUN7 in FIG. 13, the tracking performance of the second system output is shown as RUN7 in FIG. 14, the first control input is shown as RUN7 in FIG. 15, and the second control input is shown as RUN7 in FIG. 16; evaluate the control method from the control performance indexes: the RMSE($e_1$) of the first system output, RUN7 in FIG. 13, is 2.3072, and the RMSE($e_2$) of the second system output, RUN7 in FIG. 14, is 0.1683.

The eighth experiment (RUN8): the existing MIMO partial-form model-free control method with the same-factor structure is adopted to control the above two-input two-output MIMO system; set the penalty factor $\lambda=0.05$, the step-size factors $\rho_1=1.5$, $\rho_2=\rho_3=\rho_4=1$; the tracking performance of the first system output is RUN8 in FIG. 13, the tracking performance of the second system output is RUN8 in FIG. 14, the first control input is the RUN8 in FIG. 15, and the second control input is RUN8 in FIG. 16; evaluate the control method from the control performance indexes: the RMSE($e_1$) of the first system output, RUN8 in FIG. 13, is 2.4435, and the RMSE($e_2$) of the second system output, RUN8 in FIG. 14, is 0.1828.

The comparison results of control performance indexes of the three experiments are shown in Table 2; the results of the sixth experiment (RUN6) using the inventive control method are superior to those of the seventh experiment (RUN7) using the MIMO different-factor partial-form model-free control method with fixed parameters, and are more significantly superior to those of the eighth experiment (RUN8) using the existing MIMO partial-form model-free control method with the same-factor structure, which have a significant improvement, indicating that the inventive MIMO different-factor partial-form model-free control method with parameter self-tuning has higher control accuracy, stronger stability and wider applicability.

TABLE 2

Comparison Results of The Control Performance of Coal Mill

| | The first system output | | The second system output | |
|---|---|---|---|---|
| | RMSE($e_1$) | Improvement | RMSE($e_2$) | Improvement |
| RUN6 | 2.0549 | 15.903% | 0.1554 | 14.989% |
| RUN7 | 2.3072 | 5.578% | 0.1638 | 10.394% |
| RUN8 | 2.4435 | Baseline | 0.1828 | Baseline |

Furthermore, the following six points should be noted in particular:

(1) In the fields of oil refining, petrochemical, chemical, pharmaceutical, food, paper, water treatment, thermal power, metallurgy, cement, rubber, machinery, and electrical industry, most of the controlled plants, such as reactors, distillation columns, machines, equipment, devices, production lines, workshops and factories, are essentially MIMO systems; some of these MIMO systems have the complex characteristics of non-minimum phase nonlinear system, which belong to the MIMO systems that are particularly difficult to control; for example, the continuous stirred tank reactor (CSTR), commonly used in oil refining, petrochemical, chemical, etc. is a two-input two-output MIMO system, where the two inputs are feed flow and cooling water flow, and the two outputs are product concentration and reaction temperature; when the chemical reaction has strong exothermic effect, the continuous stirred tank reactor (CSTR) is a MIMO system with complex characteristics of non-minimum phase nonlinear system, which is particularly difficult to control. In the first exemplary embodiment, the controlled plant with two inputs and two outputs also has the complex characteristic of non-minimum phase nonlinear system and belongs to the MIMO system that is particularly difficult to control; the inventive controller is capable of controlling the plant with high accuracy, strong stability and wide applicability, indicating that it can also achieve high accuracy, strong stability and wide applicability control on complex MIMO systems such as reactors, distillation columns, machines, equipment, devices, production lines, workshops, factories, etc.

(2) In the first and second exemplary embodiments, the hardware platform for running the inventive controller is the industrial control computer; in practical applications, according to the specific circumstance, a single chip microcomputer controller, a microprocessor controller, a field programmable gate array controller, a digital signal processing controller, an embedded system controller, a programmable logic controller, a distributed control system, a fieldbus control system, an industrial control system based on internet of things, or an industrial internet control system, can also be used as the hardware platform for running the inventive control method.

(3) In the first and second exemplary embodiments, the j-th error $e_j(k)$ is defined as the difference between the j-th desired system output $y_j^*(k)$ and the j-th actual system output $y_j(k)$, namely $e_j(k)=y_j^*(k)-y_j(k)$, which is only one of the methods for calculating the j-th error; the j-th error $e_j(k)$ can also be defined as the difference between the j-th desired system output $y_j^*(k+1)$ at time k+1 and the j-th actual system output $y_j(k)$, namely $e_j(k)=y_j^*(k+1)-y_j(k)$; the j-th error $e_j(k)$ can also be defined by other methods whose independent variables include the j-th desired system output and the j-th actual system output, for example, $$e_j(k) = \frac{y_j^*(k+1) + y_j^*(k)}{2} - y_j(k);$$

for the controlled plants in the first and second exemplary embodiments, all different definitions of the error function can achieve good control performance.

(4) The inputs of BP neural network include at least one of: the elements in set {gradient set}, and the elements in set {error set}; when the inputs of BP neural network include the elements in set {gradient set}, the gradients at time k−1 are used in the first exemplary embodiment, namely $$\left\{\frac{\partial u_1(k-1)}{\partial \lambda_1}, \frac{\partial u_1(k-1)}{\partial \rho_{1,1}}, \frac{\partial u_1(k-1)}{\partial \rho_{1,2}}, \frac{\partial u_1(k-1)}{\partial \rho_{1,3}}, \right.$$
$$\left. \frac{\partial u_2(k-1)}{\partial \lambda_2}, \frac{\partial u_2(k-1)}{\partial \rho_{2,1}}, \frac{\partial u_2(k-1)}{\partial \rho_{2,2}}, \frac{\partial u_2(k-1)}{\partial p_{2,3}}\right\};$$

in practical applications, the gradients at more time can be further added according to the specific situation; for example, the gradients at time k−2 can be added, namely $$\left\{\frac{\partial u_1(k-2)}{\partial \lambda_1}, \frac{\partial u_1(k-2)}{\partial \rho_{1,1}}, \frac{\partial u_1(k-2)}{\partial \rho_{1,2}}, \frac{\partial u_1(k-2)}{\partial \rho_{1,3}},\right.$$
$$\left.\frac{\partial u_2(k-2)}{\partial \lambda_2}, \frac{\partial u_2(k-2)}{\partial \rho_{2,1}}, \frac{\partial u_2(k-2)}{\partial \rho_{2,2}}, \frac{\partial u_2(k-2)}{\partial \rho_{2,3}}\right\};$$

when the inputs of BP neural network include the elements in set {error set}, the error function group $$\left\{e_1(k), \sum_{t=0}^{k} e_1(t), e_1(k)-e_1(k-1), e_2(k), \sum_{t=0}^{k} e_2(t), e_2(k)-e_2(k-1)\right\}$$

is used in the first and second exemplary embodiments; in practical applications, more error function groups can be further added to the set {error set} according to the specific situation; for example, the second order backward difference of the j-th error $e_{jy}(k)$, namely $\{e_1(k)-2e_1(k-1)+e_1(k-2), e_2(k)-2e_2(k-1)+e_2(k-2)\}$, can also be added into the inputs of BP neural network; furthermore, the inputs of BP neural network include, but is not limited to, the elements in set {gradient set} and set {error set}; for example, $\{u_1(k-1), u_2(k-1)\}$ can also be added into the inputs of BP neural network; for the controlled plants in the first and second exemplary embodiments, the inventive controller can achieve good control performance with the increasing of the number of input layer nodes of BP neural network, and in most cases it can slightly improve the control performance, but at the same time it increases the computational burden; therefore, the number of input layer nodes of BP neural network can be set to a reasonable number according to specific conditions in practical applications.

(5) In the first and second exemplary embodiments, when updating the hidden layer weight coefficients and the output layer weight coefficients with the objective of minimizing the system error function, all contributions of n errors are comprehensively considered in said system error function $$\sum_{jy=1}^{n} e_{jy}^2(k),$$

which is just one of the system error functions; said system error function can also adopt other functions whose independent variables include any one or any combination of the elements in n errors, n desired system outputs and n actual system outputs; for example, said system error function can adopt another way of $$\sum_{jy=1}^{n} e_{jy}^2(k),$$

such as $$\sum_{jy=1}^{n} (y_{jy}^*(k)-y_{jy}(k))^2 \text{ or } \sum_{jy=1}^{n} (y_{jy}^*(k+1)-y_{jy}(k))^2;$$

for another example, said system error function can adopt $$\sum_{jy=1}^{n} a_{jy} e_{jy}^2(k) + \sum_{iu=1}^{m} b_{iu} \Delta u_{iu}^2(k),$$

where $e_{jy}(k)$ is the jy-th error at time k, $\Delta u_{iu}(k)=u_{iu}(k)-u_{iu}(k-1)$, $u_{iu}(k)$ is the iu-th control input at time k, $a_{jy}$ and $b_{iu}$ are two constants greater than or equal to 0, jy and iu are two positive integers; obviously, when $b_{iu}$ equals to zero, said system error function only considers the contribution of $e_{jy}^2(k)$, indicating that the objective is to minimize the system error and pursue high control accuracy; when $b_{iu}$ is greater than zero, said system error function considers the contributions of $e_{jy}^2(k)$ and $\Delta u_{iu}^2(k)$ simultaneously, indicating that the objective is not only to minimize the system error but also to minimize the variance of control inputs, that is, to pursue high control accuracy and stable control; for the controlled plants in the first and second exemplary embodiments, all different system error functions can achieve good control performance; compared with the system error function only considering the contribution of $e_{jy}^2(k)$, the control accuracy is slightly reduced while the handling stability is improved when the contributions of $e_{jy}^2(k)$ and $\Delta u_{iu}^2(k)$ are taken into account simultaneously in the system error function.

(6) The parameters to be tuned in said MIMO different-factor partial-form model-free control method with parameter self-tuning include at least one of: penalty factors $\lambda_i$, and step-size factors $\rho_{i,1}, \ldots, \rho_{i,L}$ (i=1, ..., m); in the first exemplary embodiment, all penalty factors $\lambda_1$, $\lambda_2$ and step-size factors $\rho_{1,1}$, $\rho_{1,2}$, $\rho_{1,3}$, $\rho_{2,1}$, $\rho_{2,2}$, $\rho_{2,3}$ are self-tuned in the first experiment to the third experiment; in the fourth experiment, only the step-size factors $\rho_{2,1}$, $\rho_{2,2}$, $\rho_{2,3}$ for the second control input are self-tuned, while the penalty factors $\lambda_1$, $\lambda_2$ and step-size factors $\rho_{1,1}$, $\rho_{1,2}$, $\rho_{1,3}$ are fixed; in practical applications, any combination of the parameters to be tuned can be chosen according to the specific situation; in addition, said parameters to be tuned include, but are not limited to: penalty factors $\lambda_i$, and step-size factors $\rho_{i,1}, \ldots, \rho_{i,L}$ (i=1, ..., m); for example, said parameters to be tuned can also include the parameters for calculating the estimated value of pseudo partitioned Jacobian matrix $\Phi(k)$ for said MIMO system.

It should be appreciated that the foregoing is only preferred embodiments of the invention and is not for use in limiting the invention. Any modification, equivalent substitution, and improvement without departing from the spirit and principle of this invention should be covered in the protection scope of the invention.

The invention claimed is:

1. A method of MIMO different-factor partial-form model-free control with parameter self-tuning, executed on a hardware platform for controlling a controlled plant being a multi-input multi-output (MIMO) system, wherein the MIMO system having a predetermined number of control inputs and a predetermined number of system outputs, said controlled plant comprises at least one of: a reactor, a distillation column, a machine, a device, a set of equipment, a production line, a workshop, and a factory, said hardware platform comprises at least one of: an industrial control computer, a single chip microcomputer controller, a microprocessor controller, a field programmable gate array controller, a digital signal processing controller, an embedded system controller, a programmable logic controller, a distributed control system, a fieldbus control system, an industrial control system based on internet of things, and an industrial internet control system, said method comprising:

calculating the i-th control input $u_i(k)$ at time k as follows:

$$u_i(k) = u_i(k-1) + \frac{\sum_{j=1}^{n} \phi_{j,i,1}(k)\left(\rho_{i,1}e_j(k) - \sum_{p=2}^{L}\rho_{i,p}\left(\sum_{iu=1}^{m}\phi_{j,iu,p}(k)\Delta u_{iu}(k-p+1)\right)\right)}{\lambda_i + \|\Phi_1(k)\|^2}$$

where k is a positive integer; m is the total number of control inputs in said MIMO system, m is a positive integer greater than 1; n is the total number of system outputs in said MIMO system, n is a positive integer; i denotes the i-th of the total number of control inputs in said MIMO system, i is a positive integer, $1 \leq i \leq m$; j denotes the j-th of the total number of system outputs in said MIMO system, j is a positive integer, $1 \leq j \leq n$; $u_i(k)$ is the i-th control input at time k; $\Delta u_{iu}(k) = u_{iu}(k) - u_{iu}(k-1)$, iu is a positive integer; $e_j(k)$ is the j-th error at time k, namely the j-th element in the error vector $e(k) = [e_1(k), \ldots, e_n(k)]^T$; $\Phi(k)$ is the estimated value of pseudo partitioned Jacobian matrix for said MIMO system at time k, $\Phi_p(k)$ is the p-th block of $\Phi(k)$, $\phi_{j,i,p}(k)$ is the j-th row and the i-th column of matrix $\Phi_p(k)$, $\|\Phi_1(k)\|$ is the 2-norm of matrix $\Phi_1(k)$; p is a positive integer, $1 \leq p \leq L$; $\lambda_i$ is the penalty factor for the i-th control input; $\rho_{i,p}$ is the p-th step-size factor for the i-th control input; L is the control input length constant of linearization and L is a positive integer;

for said MIMO system, calculating a control input vector $u(k) = [u_1(k), \ldots, u_m(k)]^T$ by traversing all values of i in the positive integer interval [1, m];

said method has a different-factor characteristic; said different-factor characteristic is that at least one of the following L+1 inequalities holds true for any two unequal positive integers i and x in the positive integer interval [1, m] during controlling said MIMO system by using said method:

$\lambda_i \neq \lambda_x$; $\rho_{i,1} \neq \rho_{x,1}$; $\ldots$; $\rho_{i,L} \neq \rho_{x,L}$ during controlling said MIMO system by using said method, performing parameter self-tuning on the parameters to be tuned in said mathematical formula for calculating the control input vector $u(k) = [u_1(k), \ldots, u_m(k)]^T$ at time k; said parameters to be tuned comprise at least one of: penalty factors $\lambda_i$, and step-size factors $\rho_{i,1}, \ldots, \rho_{i,L}$ (i=1, \ldots, m); and obtaining the system outputs from the MIMO system by adjusting the control inputs of the MIMO system based on the calculated control input vector, such that the system outputs of the MIMO system approach desired system outputs to be received by the hardware platform.

2. The method as claimed in claim 1 wherein said parameter self-tuning adopts neural network to calculate the parameters to be tuned in the mathematical formula of said control input vector $u(k) = [u_1(k), \ldots, u_m(k)]^T$; when updating the hidden layer weight coefficients and output layer weight coefficients of said neural network, the gradients at time k of said control input vector $u(k) = [u_1(k), \ldots, u_m(k)]^T$ with respect to the parameters to be tuned in their respective mathematical formula are used; the gradients at time k of $u_i(k)$ (i=1, \ldots, m) in said control input vector $u(k) = [u_1(k), \ldots, u_m(k)]^T$ with respect to the parameters to be tuned in the mathematical formula of said $u_i(k)$ comprise the partial derivatives at time k of $u_i(k)$ with respect to the parameters to be tuned in the mathematical formula of said $u_i(k)$; the partial derivatives at time k of said $u_i(k)$ with respect to the parameters to be tuned in the mathematical formula of said $u_i(k)$ are calculated as follows:

when the parameters to be tuned in the mathematical formula of said $u_i(k)$ include penalty factor $\lambda_i$, the partial derivative at time k of $u_i(k)$ with respect to said penalty factor $\lambda_i$ is:

$$\frac{\partial u_i(k)}{\partial \lambda_i} = \frac{\sum_{j=1}^{n} \phi_{j,i,1}(k)\left(\sum_{p=2}^{L}\rho_{i,p}\left(\sum_{iu=1}^{m}\phi_{j,iu,p}(k)\Delta u_{iu}(k-p+1)\right) - \rho_{i,1}e_j(k)\right)}{(\lambda_i + \|\Phi_1(k)\|^2)^2}$$

when the parameters to be tuned in the mathematical formula of said $u_i(k)$ include step-size factor $\rho_{i,1}$, the partial derivative at time k of $u_i(k)$ with respect to said step-size factor $\rho_{i,1}$ is:

$$\frac{\partial u_i(k)}{\partial \rho_{i,1}} = \frac{\sum_{j=1}^{n} \phi_{j,i,1}(k)e_j(k)}{\lambda_i + \|\Phi_1(k)\|^2}$$

when the parameters to be tuned in the mathematical formula of said $u_i(k)$ include step-size factor $\rho_{i,p}$ where $2 \leq p \leq L$, the partial derivative at time k of $u_i(k)$ with respect to said step-size constant $\rho_{i,p}$ is:

$$\frac{\partial u_i(k)}{\partial \rho_{i,p}} = -\frac{\sum_{j=1}^{n} \phi_{j,i,1}(k)\left(\sum_{iu=1}^{m}\phi_{j,iu,p}(k)\Delta u_{iu}(k-p+1)\right)}{\lambda_i + \|\Phi_1(k)\|^2}$$

putting all partial derivatives at time k calculated by said $u_i(k)$ with respect to the parameters to be tuned in the mathematical formula of said $u_i(k)$ into the set {gradient of $u_i(k)$}; for said MIMO system, traversing all values of i in the positive integer interval [1, m] and obtaining the set {gradient of $u_1(k)$}, $\ldots$, set {gradient of $u_m(k)$}, then putting them all into the set {gradient set}; said set {gradient set} is a set comprising all sets {{gradient of $u_1(k)$}, $\ldots$, {gradient of $u_m(k)$}};

said parameter self-tuning adopts neural network to calculate the parameters to be tuned in the mathematical formula of the control input vector $u(k) = [u_1(k), \ldots, u_m(k)]^T$; the inputs of said neural network comprise at least one of: elements in said set {gradient set}, and elements in set {error set}; said set {error set} comprises at least one of: the error vector $e(k) = [e_1(k), \ldots, e_n(k)]^T$, and error function group of element $e_j(k)$ (j=1, \ldots, n) in said error vector $e(k)$; said error function group of element $e_j(k)$ comprises at least one of: the accumulation of the j-th error at time k and all previous times $$\sum_{t=0}^{k} e_j(t),$$

the first order backward difference of the j-th error $e_j(k)$ at time k $e_j(k)-e_j(k-1)$, the second order backward difference of the j-th error $e_j(k)$ at time k $e_j(k)-2e_j(k-1)+e_j(k-2)$, and high order backward difference of the j-th error $e_j(k)$ at time k.

3. The method as claimed in claim 2 wherein said neural network is BP neural network; said BP neural network adopts a single hidden layer structure, namely a three-layer network structure, comprising an input layer, a single hidden layer, and an output layer.

4. The method as claimed in claim 2 wherein aiming at minimizing a system error function, said neural network adopts gradient descent method to update the hidden layer weight coefficients and the output layer weight coefficients, where the gradients are calculated by system error back propagation; independent variables of said system error function comprise at least one of: elements in the error vector $e(k)=[e_1(k), \ldots, e_n(k)]^T$, n desired system outputs, and n actual system outputs.

5. The method as claimed in claim 4 wherein said system error function is defined as $$\sum_{jy=1}^{n} a_{jy} e_{jy}^2(k) + \sum_{iu=1}^{m} b_{iu} \Delta u_{iu}^2(k),$$

where $e_{jy}(k)$ is the jy-th error at time k, $\Delta u_{iu}(k)=u_{iu}(k)-u_{iu}(k-1)$, $u_{iu}(k)$ is the iu-th control input at time k, $a_{jy}$ and $b_{iu}$ are two constants greater than or equal to zero, jy and iu are two positive integers.

6. The method as claimed in claim 1 wherein said j-th error $e_j(k)$ at time k is calculated by the j-th error function; independent variables of said j-th error function comprise the j-th desired system output and the j-th actual system output.

7. The method as claimed in claim 6 wherein said j-th error function adopts at least one of: $e_j(k)=y_j^*(k)-y_j(k)$, $e_j(k)=y_j^*(k+1)-y_j(k)$, $e_j(k)=y_j(k)-y_j^*(k)$, and $e_j(k)=y_j(k)-y_j^*(k+1)$, where $y_j^*(k)$ is the j-th desired system output at time k, $y_j^*(k+1)$ is the j-th desired system output at time k+1, and $y_j(k)$ is the j-th actual system output at time k.

\* \* \* \* \*